United States Patent
Kaneda et al.

(10) Patent No.: US 12,314,490 B2
(45) Date of Patent: May 27, 2025

(54) ELECTRONIC PEN

(71) Applicant: Wacom Co., Ltd., Saitama (JP)

(72) Inventors: Takenori Kaneda, Saitama (JP); Hock Meng Wan, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/740,351

(22) Filed: Jun. 11, 2024

(65) Prior Publication Data

US 2024/0329759 A1    Oct. 3, 2024

Related U.S. Application Data

(63) Continuation of application No. PCT/JP2022/046017, filed on Dec. 14, 2022.

(30) Foreign Application Priority Data

Jan. 11, 2022    (JP) ................... 2022-002001

(51) Int. Cl.
*G06F 3/0354*    (2013.01)
*G06F 3/038*    (2013.01)

(52) U.S. Cl.
CPC .......... *G06F 3/03545* (2013.01); *G06F 3/038* (2013.01)

(58) Field of Classification Search
None
See application file for complete search history.

(56) References Cited

U.S. PATENT DOCUMENTS

| | | |
|---|---|---|
| 2013/0199311 A1 | 8/2013 | Horie et al. |
| 2016/0188016 A1 | 6/2016 | Munakata et al. |
| 2017/0068339 A1* | 3/2017 | Zimmerman ....... G06F 3/03545 |
| 2017/0108950 A1* | 4/2017 | Clements ............ G06F 3/03547 |
| 2018/0101251 A1* | 4/2018 | Fujitsuka .............. G06F 3/0383 |
| 2022/0019300 A1* | 1/2022 | Yamashita ............ G06F 3/0383 |

FOREIGN PATENT DOCUMENTS

| | | |
|---|---|---|
| JP | 2013-161307 A | 8/2013 |
| JP | 2016-126503 A | 7/2016 |
| JP | 6359790 B1 | 7/2018 |
| JP | 2021-185544 A | 12/2021 |

OTHER PUBLICATIONS

English Translation of International Search Report for International Application No. PCT/JP2022/046017, mailed Feb. 28, 2023. (2 pages).

* cited by examiner

*Primary Examiner* — Stephen T. Reed
(74) *Attorney, Agent, or Firm* — Seed IP Law Group LLP

(57) ABSTRACT

Provided is an electronic pen including a tubular first casing having an opening on a pen tip side, and a tubular second casing rotatably coupled to the first casing with an axial direction of the first casing as a center to receive an instruction of a user, on a side of the first casing opposite to the pen tip side in the axial direction. The first casing includes a first circuit board having a first circuit including a circuit that performs signal interaction with a position detecting sensor. The second casing includes a second circuit board having a second circuit. The first and second circuit boards are electrically connected to each other by a flexible cable disposed in a state of having a surplus portion that can be extended is extendable or contractable in the axial direction and is twistable in a rotational direction about the axial direction.

18 Claims, 10 Drawing Sheets

F I G. 1
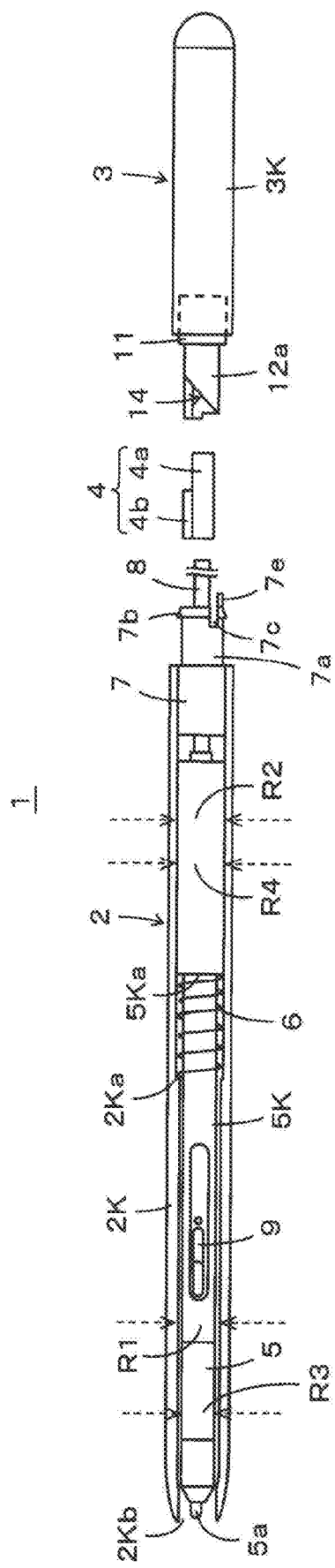

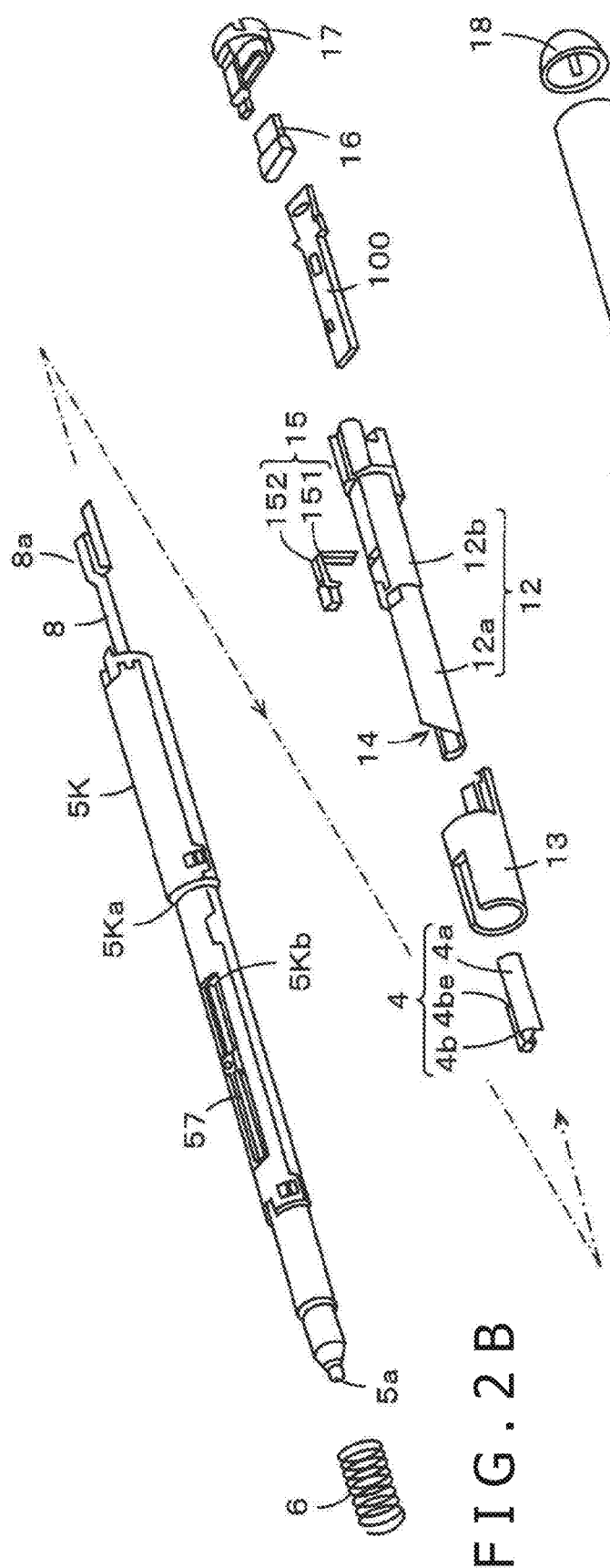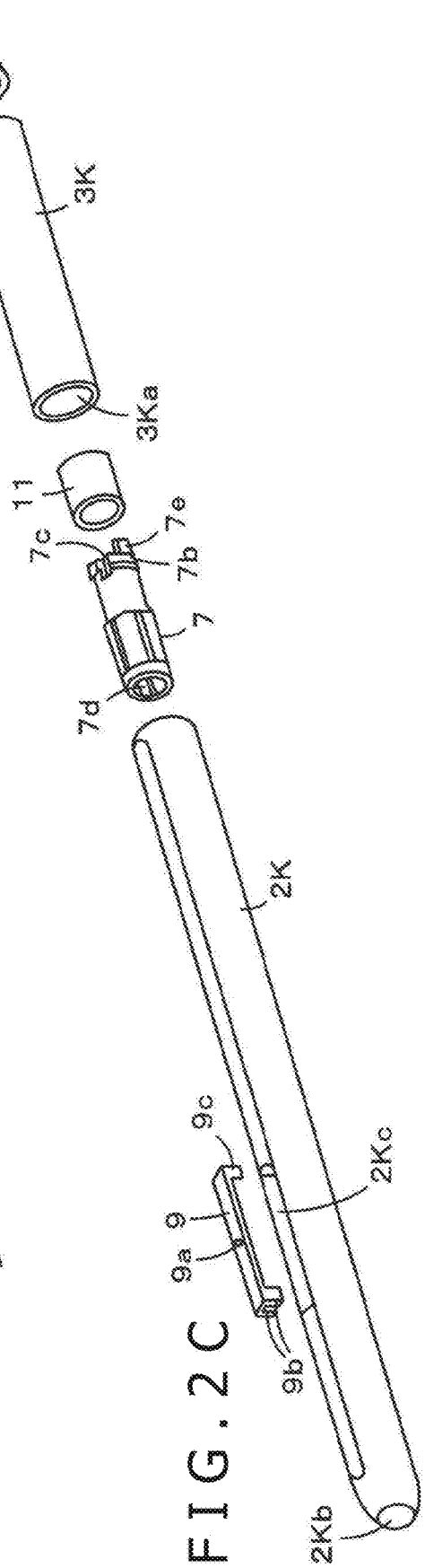

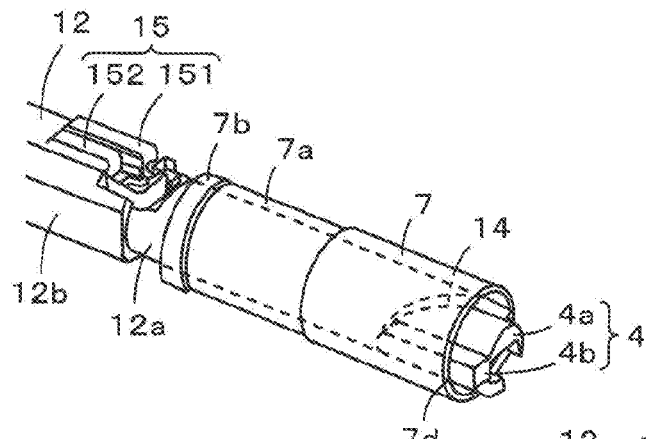
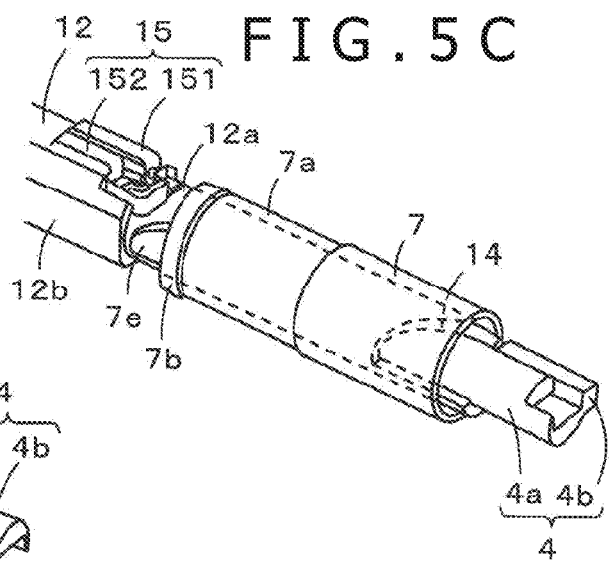
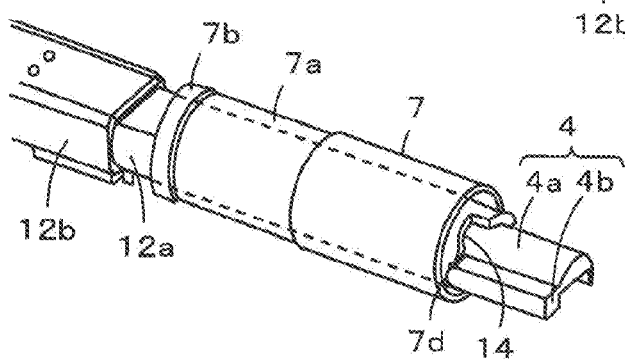
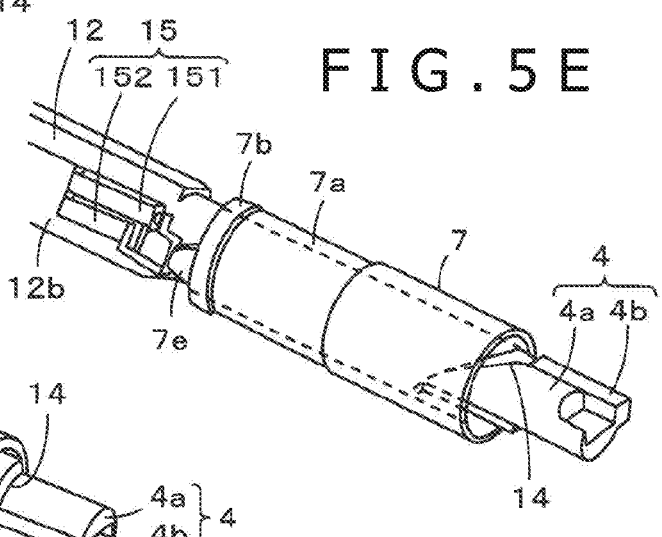

ELECTRONIC PEN

BACKGROUND

Technical Field

The present disclosure relates to an electronic pen that performs position indication input by performing signal interaction with a position detecting sensor.

Description of the Related Art

An electronic pen includes, within a casing, a circuit board provided with a circuit for performing signal interaction with a position detecting sensor. Provided on the circuit board are not only the circuit for performing signal interaction with the position detecting sensor but also a circuit for detecting a pen pressure applied to a pen tip of the electronic pen and another additional circuit or peripheral circuit.

Moreover, recently, the electronic pen has been reduced in thickness, and a part having main functions (including at least a function of performing signal interaction with the position detecting sensor) of the electronic pen has been formed as a module or a cartridge for the convenience of mass production (see Japanese Patent Laid-Open No. 2021-185544, Japanese Patent No. 6359790, and the like). In the following, the part that is formed as a module or a cartridge and has the main functions of the electronic pen will be referred to as an electronic pen main body unit.

Now, there are many cases where the addition of a new function to the electronic pen or the changing of a function of the electronic pen is requested. In such cases, it is not easy to make such a change that a circuit for effecting the addition or changing of a function as described above is provided to the existing electronic pen main body unit. In general, it is necessary to create a circuit board for which circuit design is newly made again. In addition, a new electronic pen main body unit is generally re-created in a case of an electronic pen using an electronic pen main body unit formed as a module or a cartridge.

However, this renders the existing circuit board and the electronic pen main body unit formed as a module or a cartridge completely useless, and consequently causes a high cost.

In addition, in a case where the function to be added or changed involves an operation instruction by a user, it has been a common practice in the existing technology to add an operating unit such as a push-button switch or a slide switch for the operation instruction. However, in cases of adding a new operating unit, a configuration becomes complex, where to arrange these operating units becomes a problem, and there is also a disadvantage in that the addition is not desirable in terms of operability.

BRIEF SUMMARY

Embodiments of the present disclosure provide a position indicator that can solve the above problems.

In order to solve the above problems, there is provided an electronic pen including a first casing that is tubular and has an opening on a pen tip side of the first casing, and a second casing that is tubular and configured to be rotatably coupled to the first casing with an axial direction of the first casing as a center to receive an instruction of a user, on a side of the first casing opposite to the pen tip side of the first casing in the axial direction of the first casing. The first casing includes a first circuit board provided with a first circuit including a circuit that, in operation, performs signal interaction with a position detecting sensor. The second casing includes a second circuit board provided with a second circuit connected to the first circuit. The first circuit board and the second circuit board are electrically connected to each other by a flexible cable disposed in a state of having a surplus portion that is extendable or contractable in the axial direction of the first casing and is twistable in a rotational direction about the axial direction of the first casing.

The electronic pen having the above-described configuration includes the first casing that is tubular and has the opening on the pen tip side of the first casing, and the second casing coupled to the side of the first casing opposite to the pen tip side of the first casing in the axial direction of the first casing. Moreover, the first casing includes the first circuit board provided with the first circuit including the circuit for performing signal interaction with the position detecting sensor, the second casing includes the second circuit board provided with the second circuit connected to the first circuit, and the first circuit board and the second circuit board are electrically connected to each other by the flexible cable.

Since a circuit board is thus divided into the first circuit board and the second circuit board, a circuit part for an additional function can be formed on the second circuit board, and the first circuit board can be formed by using an existing circuit board as it is or slightly reworking the existing circuit board.

Moreover, the electronic pen having the above-described configuration is configured such that an operation for a predetermined instruction by the user is performed by rotating the second casing about the axial direction of the first casing with respect to the first casing. Hence, a new operating unit such as a push-button switch for the operation is rendered unnecessary.

Moreover, in the electronic pen having the above-described configuration, the first circuit board and the second circuit board are electrically connected to each other by the flexible cable, and the flexible cable has the surplus portion capable of being extended and contracted in the axial direction, and is disposed in a state of being able to be twisted in a rotational direction about the axial direction.

Hence, even when the second casing is rotated about the axial direction with respect to the first casing, a displacement caused to the flexible cable by the rotation is accommodated by the surplus portion and a twisted part. Thus, the electric connection state is maintained stably without an overload being applied to connecting portions between the flexible cable and the first circuit board and between the flexible cable and the second circuit board.

BRIEF DESCRIPTION OF THE SEVERAL VIEWS OF THE DRAWINGS

FIG. 1 is a diagram of assistance in explaining main constituent parts of an electronic pen according to a first embodiment of the present disclosure;

FIGS. 2A, 2B, and 2C are exploded views in which parts of the electronic pen according to the first embodiment of the present disclosure are arranged in an axial direction;

FIGS. 5A, 5B, 5C, 5D, and 5E are diagrams of assistance in explaining an example of a configuration for turning on a switch when the second casing is rotated with respect to the first casing in the electronic pen according to the first embodiment of the present disclosure;

DETAILED DESCRIPTION

Figure 3A:
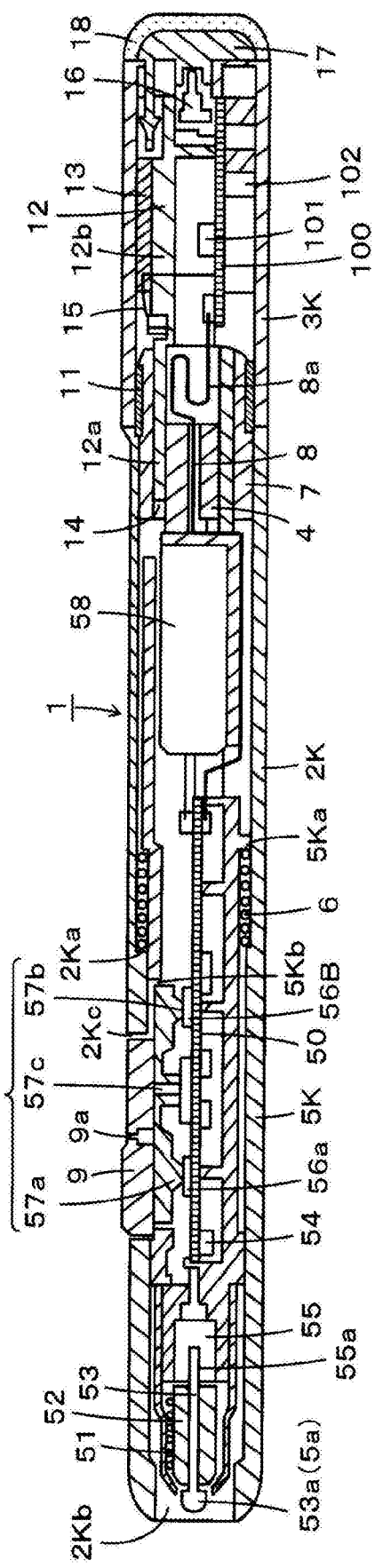
FIGS. 3A and 3B are longitudinal sectional views of a state in which a second casing is coupled to the rear end side of a first casing in the axial direction of the electronic pen according to the first embodiment of the present disclosure.

An electronic pen according to embodiments of the present disclosure will hereinafter be described with reference to the drawings. The electronic pen according to the embodiment to be described in the following represents an example of a case where the electronic pen has a configuration in which a pen tip portion of an electronic pen main body unit having a configuration of a cartridge is made to protrude and retract from an opening of an electronic pen casing by a rotation system (twist system).

Outline of Electronic Pen 1 According to Embodiment

FIG. 1 is a diagram of assistance in explaining main constituent parts of an electronic pen 1 according to an embodiment. The electronic pen 1 according to the present embodiment is constituted by a pen tip side module 2, a rear end side module 3, and a sliding member 4 as a follower that is slidingly moved in an axial direction by a rotating cam (twist cam) portion as a driver provided to the rear end side module 3 side, as will be described later.

The electronic pen 1 according to the present embodiment can be formed by coupling the rear end side module 3 to the rear end side of the pen tip side module 2 in the axial direction in a state in which the sliding member 4 is partially inserted in the pen tip side of the rear end side module 3.

In an initial state (steady state) in which the rear end side module 3 is coupled to the rear end side of the pen tip side module 2 in the axial direction, a pen tip portion 5a of an electronic pen main body unit 5 within a casing 2K of the pen tip side module 2 (which casing will be referred to as a pen tip side casing) is housed within the pen tip side casing 2K without protruding from an opening 2Kb on the pen tip side of the pen tip side casing 2K. The pen tip portion 5a of the electronic pen main body unit 5 is thus protected.

Further, in the electronic pen 1 according to the present embodiment, when the rear end side module 3 is rotated with respect to the pen tip side module 2 in a predetermined rotational direction, or, for example, a clockwise direction, about the axial direction by a predetermined rotational angle, or 180 degrees in the present example, the pen tip portion 5a of the electronic pen main body unit 5 protrudes from the opening 2Kb of the pen tip side casing 2K, so that the electronic pen 1 is set in a usable state.

When the rear end side module 3 is rotated in a counterclockwise direction about the axial direction by 180 degrees from this usable state, the pen tip portion 5a of the electronic pen main body unit 5 is returned to the initial state in which the pen tip portion 5a is housed within the pen tip side casing 2K without protruding from the opening 2Kb of the pen tip side casing 2K.

In addition, the electronic pen 1 according to the embodiment to be described in the following is configured to be able to switch an operation mode of the electronic pen 1 while the electronic pen 1 maintains the usable state in which the pen tip portion 5a of the electronic pen main body unit 5 is protruded from the opening 2Kb of the pen tip side casing 2K, when the electronic pen 1 is set in the usable state by rotating the rear end side module 3 by 180 degrees in the clockwise direction and, thereafter, the rear end side module 3 is further rotated in the clockwise direction about the axial direction by a predetermined rotational angle, or 60 degrees in the present example. In the embodiment to be described in the following, the mode switching is performed by a switch that is switching-controlled (turned on in the present example) as the rear end side module 3 is rotated in the axial direction.

Incidentally, the electronic pen 1 according to the embodiment to be described in the following represents a case of an electronic pen of an electromagnetic induction system. Moreover, in the present embodiment, as will be described later, the mode switching is performed by switching the resonance frequency of a resonance circuit of the electronic pen 1 of the electromagnetic induction system.

Configuration of Electronic Pen 1 According to Embodiment

A configuration and operation of the electronic pen 1 according to the embodiment that has functions as described above will be described with reference to FIGS. 2A to 2C and subsequent figures.

FIGS. 2A to 2C are exploded views in which parts of the electronic pen 1 according to the present embodiment are arranged in the axial direction. FIG. 2A illustrates a part group housed within the pen tip side casing 2K of the pen tip side module 2. In addition, FIG. 2B illustrates a part group housed within a casing 3K of the rear end side module 3 (which casing will be referred to as a rear end side casing) except for the sliding member 4. Further, FIG. 2C illustrates the pen tip side casing 2K of the pen tip side module 2, the rear end side casing 3K of the rear end side module 3, parts 7 and 11 for coupling the pen tip side casing 2K and the rear end side casing 3K to each other, and a rear end side cap 18.

Figure 3B:
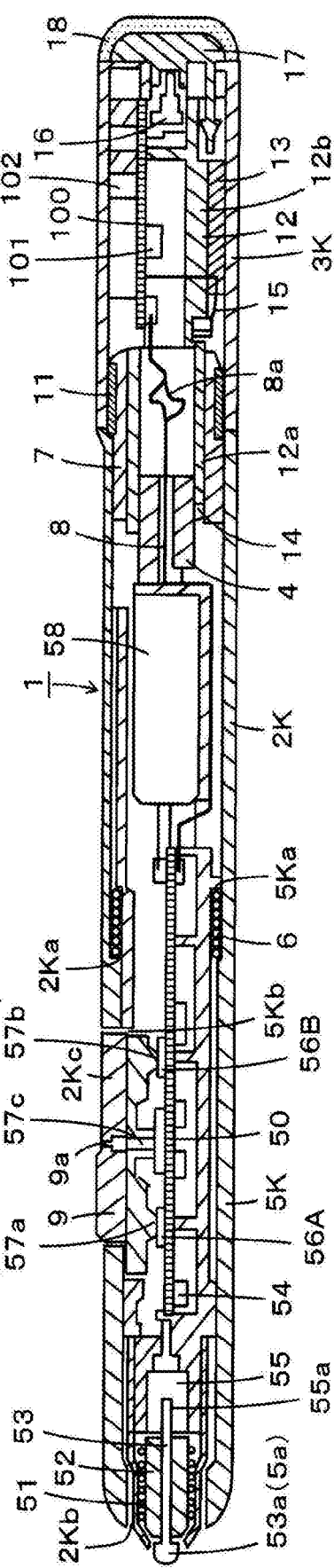

In addition, FIGS. 3A and 3B are longitudinal sectional views of the electronic pen 1 in a state in which the rear end side module 3 is coupled to the rear end side of the pen tip side module 2 in the axial direction. FIG. 3A is a longitudinal sectional view of the electronic pen 1 in the initial state. In addition, FIG. 3B is a longitudinal sectional view of the electronic pen 1 in the usable state set by the rotation in the clockwise direction by 180 degrees from the initial state. Incidentally, though the electronic pen 1 according to the embodiment is, in practice, a thin electronic pen as illustrated in FIG. 1, FIGS. 3A and 3B illustrate the electronic pen 1 with an increased diameter in order to facilitate the description of an internal configuration with reference to the longitudinal sectional views.

As illustrated in FIG. 2C, the pen tip side casing 2K of the pen tip side module 2 in the present example is formed in a cylindrical shape, and the opening 2Kb is formed on the tapered pen tip side of the pen tip side casing 2K. As illustrated in FIG. 1 and FIGS. 3A and 3B, housed within the pen tip side casing 2K is the electronic pen main body unit 5 having a configuration of a cartridge. As illustrated in FIGS. 3A and 3B, provided within the electronic pen main body unit 5 is a circuit board (first circuit board) 50 having an electronic circuit formed thereon including a circuit for performing signal interaction with a position detecting sensor.

In the present example, the pen tip side casing 2K is formed of resin, for example. As illustrated in FIG. 1 and FIGS. 3A and 3B, the inside diameter of the pen tip side casing 2K is smaller on a pen tip side from approximately a middle in the axial direction than on a rear end side, and a step portion 2Ka is formed at a position at which the inside diameter changes. Specifically, as illustrated in FIG. 1, the inside diameter on the pen tip side from approximately the middle in the axial direction of the pen tip side casing 2K is set at R1, and the inside diameter on the rear end side is set at R2 (>R1), which is larger than the inside diameter R1 on the pen tip side.

Meanwhile, a casing 5K of the electronic pen main body unit 5 (which casing will be referred to as a main body unit casing) is formed of resin, for example, and as illustrated in FIG. 1 and FIG. 2A, a part on the rear end side of the main body unit casing 5K has a larger outside diameter than another part, with a step portion 5Ka formed at a position at which the outside diameter changes. In this case, as illustrated in FIG. 1, a maximum value R3 of the outside diameter on the pen tip side of the main body unit casing 5K of the electronic pen main body unit 5 is set at a value smaller than the inside diameter R1 on the pen tip side of the pen tip side casing 2K (R3<R1), and an outside diameter R4 on the rear end side of the main body unit casing 5K of the electronic pen main body unit 5 is set at a value larger than the inside diameter R1 on the pen tip side of the pen tip side casing 2K but smaller than the inside diameter R2 on the rear end side of the pen tip side casing 2K (R1<R4<R2).

In addition, the inside diameter of the opening 2Kb on the pen tip side of the pen tip side casing 2K of the pen tip side module 2 is set to be larger than a maximum value of the outside diameter of the pen tip portion 5a of the electronic pen main body unit 5. The pen tip portion 5a of the electronic pen main body unit 5 is thus configured to be able to protrude from the opening 2Kb on the pen tip side of the pen tip side casing 2K.

Moreover, as illustrated in FIG. 1, in the pen tip side casing 2K of the pen tip side module 2, a coil spring 6 whose winding diameter R5 is set such that R3<R5<R2 is provided to be present between the step portion 2Ka of the pen tip side casing 2K and the step portion 5Ka of the main body unit casing 5K of the electronic pen main body unit 5 in a state in which the coil spring 6 is wound around a part of the outside diameter R3 of the electronic pen main body unit 5.

Specifically, the coil spring 6 is inserted into the pen tip side casing 2K from an opening on the rear end side of the pen tip side casing 2K. Then, one end in the axial direction of the coil spring 6 abuts against the step portion 2Ka of the pen tip side casing 2K, and the coil spring 6 is locked at that position within the pen tip side casing 2K. When the electronic pen main body unit 5 is thereafter inserted from the opening on the rear end side of the pen tip side casing 2K with the pen tip portion 5a side of the electronic pen main body unit 5 in front, a small-diameter portion of the outside diameter R3 of the electronic pen main body unit 5 penetrates the coil spring 6, and enters the pen tip side of the pen tip side casing 2K. Then, the electronic pen main body unit 5 is locked within the pen tip side casing 2K when another end in the axial direction of the coil spring 6 abuts against the step portion 5Ka of the electronic pen main body unit 5. At this time, the coil spring 6 constantly acts within the pen tip side casing 2K in such a manner as to elastically bias the electronic pen main body unit 5 to the rear end side in the axial direction.

In this case, in the initial state (steady state), as illustrated in FIG. 1, the pen tip portion 5a of the electronic pen main body unit 5 is housed and protected within the pen tip side casing 2K without protruding from the opening 2Kb of the pen tip side casing 2K, by selecting the formation position of the step portion 2Ka in the pen tip side casing 2K, the formation position of the step portion 5Ka of the main body unit casing 5K of the electronic pen main body unit 5, and the length of the coil spring 6. Then, as will be described later, when the rear end side module 3 is rotated by 180 degrees, the electronic pen main body unit 5 is pushed to the pen tip side against an elastic biasing force of the coil spring 6. The usable state in which the pen tip portion 5a of the electronic pen main body unit 5 protrudes from the opening 2Kb of the pen tip side casing 2K is thereby set.

As illustrated in FIG. 1 and FIGS. 3A and 3B, a coupling member 7 for coupling to the rear end side module 3 is provided by being, for example, press-fitted to the rear end side of the pen tip side casing 2K of the pen tip side module 2. The coupling member 7 is formed of resin, for example, and is constituted by a hollow tubular body, as illustrated in FIG. 2C. Further, as illustrated in FIGS. 3A and 3B, the sliding member 4 is configured such that the sliding member 4 is movable in the axial direction within a hollow portion of the coupling member 7 and such that an end portion on the pen tip side in the axial direction of the sliding member 4 is able to abut against an end portion on the rear end side of the electronic pen main body unit 5.

As illustrated in FIG. 1 and FIGS. 3A and 3B, the coupling member 7 is attached to the rear end side of the pen tip side casing 2K in a state in which approximately half of the tubular body of the coupling member 7 protrudes from the rear end side of the pen tip side casing 2K of the pen tip side module 2. Moreover, as illustrated in FIG. 1 and FIG. 2C, a recessed portion 7a is formed in the protruding part of the coupling member 7, the recessed portion 7a being formed by making an outside diameter thereof slightly smaller than those of other parts in the axial direction. Moreover, as illustrated in FIG. 1 and FIG. 2C, a rear end side end portion of the coupling member 7 is provided with a tapered portion 7b that has a larger outside diameter than the recessed portion 7a but is tapered in such a manner as to have an outside diameter thereof reduced toward a distal end side of the rear end side end portion.

Further, as illustrated in FIG. 1 and FIG. 2C, a groove portion 7c extending from the tapered portion 7b to the recessed portion 7a in a direction along the axial direction is formed in the coupling member 7. The presence of the groove portion 7c enables the tapered portion 7b of the coupling member 7 to be elastically contracted in a direction of a center line of the tubular coupling member 7.

Meanwhile, as illustrated in FIG. 1 and FIGS. 3A and 3B, a tubular member 11 configured to be fitted to the recessed portion 7a of the coupling member 7 attached to the pen tip side module 2 is attached by being, for example, press-fitted and fixed to an opening 3Ka (see FIG. 2C) on the pen tip side of the rear end side casing 3K of the rear end side module 3. As illustrated in FIG. 2C, the length in the axial direction of the tubular member 11 is selected to be substantially equal to or slightly smaller than the length in the axial direction of the recessed portion 7a. In addition, the inside diameter of the tubular member 11 is selected to be slightly larger than the outside diameter of the recessed portion 7a of the coupling member 7, and is thus configured to allow the rear end side module 3 to be rotated about the axial direction with respect to the pen tip side of the pen tip side module 2 when the rear end side module 3 is coupled to the pen tip side module 2.

As illustrated in FIG. 2B and FIGS. 3A and 3B, a rear end side inner casing 12 constituted by a tubular body is housed within the rear end side casing 3K of the rear end side module 3. It is to be noted that, as illustrated in FIG. 2B and FIGS. 3A and 3B, the rear end side inner casing 12 includes a front end side portion 12a that has a smaller outside diameter than the inside diameter of the coupling member 7 and that constitutes a pen tip side in the axial direction and a rear end side portion 12b more to the rear end side than the front end side portion 12a, and a part of the pen tip side of the front end side portion 12a is configured to protrude to the pen tip side module 2 side from the opening 3Ka on the pen tip side of the rear end side casing 3K.

As illustrated in FIGS. 3A and 3B, the rear end side portion 12b of the rear end side inner casing 12 is covered with a tubular rear end portion cover 13 (see FIG. 2B), and a circuit board (second circuit board) 100 (see FIG. 2B and FIGS. 3A and 3B) is provided within the rear end side portion 12b. Moreover, in the present embodiment, the electronic circuit on the circuit board 50 provided to the pen tip side module 2 and an electronic circuit on the circuit board 100 provided to the rear end side module 3 are electrically connected to each other.

Electric Connection Between Circuit Board 50 and Circuit Board 100

In the electronic pen 1 according to the present embodiment, as illustrated in FIG. 1, FIG. 2A, and FIGS. 3A and 3B, a flexible cable (flexible flat cable) 8 in which a conductive pattern electrically connected to the circuit board 50 is formed is drawn out from a rear end portion of the electronic pen main body unit 5 housed in the pen tip side module 2 in order to electrically connect the circuit board 50 and the circuit board 100 to each other.

As illustrated in FIGS. 3A and 3B, the flexible cable 8 is extended to the rear end side module 3 through a space in the sliding member 4 located within the hollow portion of the coupling member 7 and a hollow portion of the front end side portion 12a of the rear end side inner casing 12. Further, the conductive pattern of the flexible cable 8 is electrically connected to the circuit board 100 housed within the rear end side inner casing 12.

In this case, the flexible cable 8 in the present example is a flexible cable in a thin sheet shape, that is, a flexible flat cable, that has such a narrow width as to be extended to the rear end side module 3 through the space in the sliding member 4 located within the hollow portion of the coupling member 7 and the hollow portion of the front end side portion 12a of the rear end side inner casing 12. Moreover, in consideration of the configuration in which the rear end side module 3 is rotated about the axial direction with respect to the pen tip side module 2, the flexible cable 8 in the present example is provided with a surplus portion 8a as illustrated in FIG. 2A and FIGS. 3A and 3B, in order to prevent the occurrence of such an effect as the occurrence of a defect in a state of electric connection between the circuit board 50 and the circuit board 100 by the flexible cable 8 due to the rotation of the rear end side module 3.

In the present embodiment, as illustrated in FIG. 2A and FIG. 3A, the surplus portion 8a is formed by curving (or bending) the flexible cable 8 extending in the axial direction of the electronic pen 1 into a U-shape in such a manner as to fold back the flexible cable 8 in a direction opposite to the extending direction, and further curving (or bending) the curved (or bent) part whose longitudinal direction is set in the opposite direction, in such a manner as to fold back the part in the same direction as the extending direction. That is, the surplus portion 8a is formed in such a manner as to have overlaps in a direction orthogonal to a flat surface of the flexible cable 8.

A total length in the longitudinal direction of the surplus portion 8a of the flexible cable 8 is set in consideration of an amount of length displacement corresponding to the rotational angle of the rear end side module 3 with respect to the pen tip side module 2, or a rotational angle of 180 degrees+ 60 degrees=240 degrees in the present example, and an amount of length displacement corresponding to an amount of twisting of the flexible cable 8 (see FIG. 3B), and also in consideration of an amount of length displacement corresponding to a movement distance in the axial direction of the electronic pen main body unit 5 because, in the present embodiment, the electronic pen main body unit 5 can be protruded and retracted from the opening 2Kb of the pen tip side casing 2K as the rear end side module 3 is rotated. Incidentally, it is needless to say that it suffices to consider only the amounts of length displacement corresponding to the rotational angle of the rear end side module 3 and the twisting of the flexible cable 8 (see FIG. 3B) in a case of a configuration in which the electronic pen main body unit 5 does not move in the axial direction even when the rear end side module 3 is rotated.

Needless to say, in a case where the circuit board 50 and the circuit board 100 are arranged at positions including the central position of circular cross sections of hollow portions of the pen tip side casing 2K and the rear end side casing 3K and the central position in the width direction of the flexible cable 8 is configured to coincide with the center line position of the pen tip side casing 2K and the rear end side casing 3K, it suffices to consider only the amount of displacement due to the amount of twisting caused by the rotation for the surplus portion 8a of the flexible cable 8. However, in a case where the circuit board 50 and the circuit board 100 are located at eccentric positions shifted from the center in the circular cross sections of the hollow portions of the pen tip side casing 2K and the rear end side module 3, the amount of length displacement corresponding to the rotational angle is taken into consideration, as described above.

Incidentally, in the present embodiment, the flexible cable 8 is formed by a shape-memory resin sheet, and is formed such that the surplus portion 8a has the folded shape as described above. Therefore, when the rear end side module 3 is rotated from the initial state (steady state) and set in a usage state, the surplus portion 8a of the flexible cable 8 is set in a twisted state and in a state of being extended in the axial direction (longitudinal direction) as illustrated in FIG. 3B, whereas, when the rear end side module 3 is returned to the original initial state after being reversely rotated, the surplus portion 8a automatically returns to the shape-memorized state as illustrated in FIG. 3A.

As is understood from the above, the surplus portion 8a of the flexible cable 8 plays a role of accommodating an amount of movement in the axial direction of the electronic pen main body unit 5 when the electronic pen main body unit 5 housed within the pen tip side casing 2K of the pen tip side module 2 is moved in the axial direction by the rotation of the rear end side module 3, and the surplus portion 8a plays a role of accommodating also an amount of twist displacement of the flexible cable 8 due to the rotation of the rear end side module 3.

Hence, according to the electronic pen 1 according to the present embodiment, the occurrence of such an effect as the occurrence of a defect in the state of electric connection between the circuit board 50 and the circuit board 100 by the flexible cable 8 can be prevented even when the pen tip side module 2 and the rear end side module 3 are respectively provided with the circuit board 50 and the circuit board 100, the circuit board 50 and the circuit board 100 are electrically connected to each other, and the electronic pen main body unit 5 is configured to be protruded and retracted from the opening 2Kb of the pen tip side casing 2K of the pen tip side module 2 by rotating the rear end side module 3 with respect to the pen tip side module 2.

Example of Configuration of Sliding Member 4 and Rotating Cam Portion

In the present embodiment, the front end side portion 12a of the rear end side inner casing 12 of the rear end side module 3 has functions of a rotating cam for slidingly moving the sliding member 4 in the axial direction when the rear end side module 3 is rotated about the axial direction with respect to the pen tip side module 2.

Specifically, in the present embodiment, the front end side portion 12a of the rear end side inner casing 12 includes a part protruding from the opening 3Ka of the pen tip side of the rear end side casing 3K to the pen tip side, and a rotating cam portion 14 that engages with the sliding member 4 and slidingly moves the sliding member 4 is formed at a distal end portion of the part protruding to the pen tip side in the front end side portion 12a, as illustrated in FIG. 1, FIG. 2B, and FIGS. 3A and 3B.

Figure 4A:
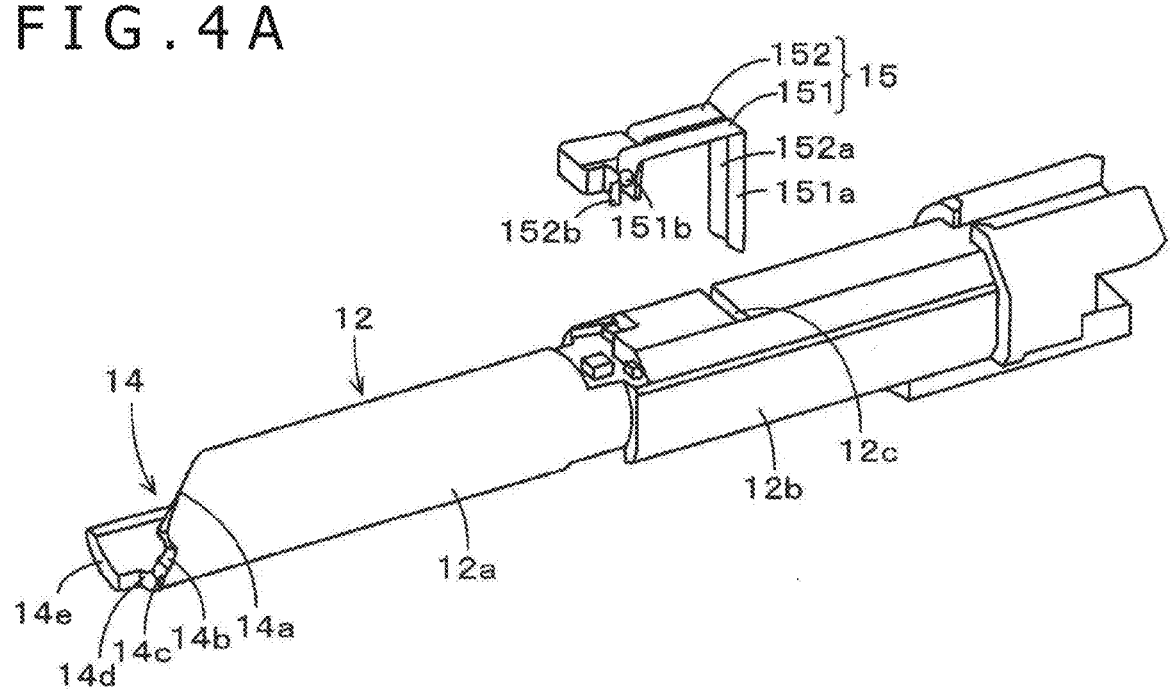
FIGS. 4A, 4B, and 4C are diagrams of assistance in explaining an example of a configuration for protruding and retracting a pen tip portion of an electronic pen main body unit housed within the first casing, from an opening of the first casing, in the electronic pen according to the first embodiment of the present disclosure.
Figure 4B:
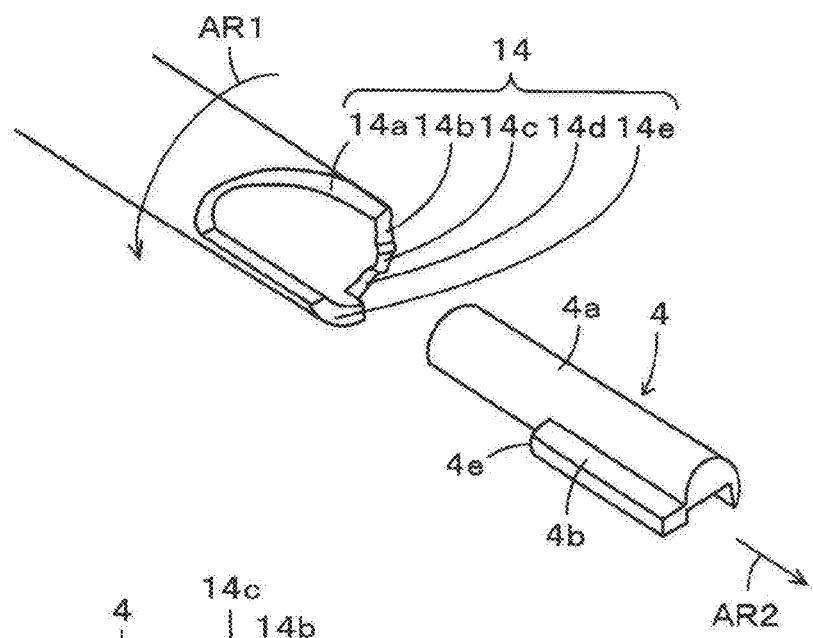

FIG. 4A is an enlarged view of the rear end side inner casing 12 illustrated in FIG. 2B. FIG. 4B is a view illustrating an example of a configuration of the rotating cam portion 14 formed at the front end side portion 12a of the rear end side inner casing 12. In addition, FIG. 4C is a view illustrating an example of a state of engagement between the rotating cam portion 14 formed at the front end side portion 12a of the rear end side inner casing 12 and the sliding member 4.

As illustrated in FIG. 4A and FIG. 4B, the rotating cam portion 14 formed at the front end side portion 12a of the rear end side inner casing 12 includes an inclined end surface portion 14a having a shape obtained by obliquely cutting a front end portion of the front end side portion 12a by an angle of 180 degrees, a first flat end surface portion 14b formed in such a manner as to be flat by an amount of a predetermined angle in a direction orthogonal to the axial direction from a front end side of the inclined end surface portion 14a, a protruding portion 14c formed by an amount of a predetermined angle from the first flat end surface portion 14b in such a manner as to protrude in the axial direction more than the first flat end surface portion 14b, a second flat end surface portion 14d formed in a manner similar to that of the first flat end surface portion 14b by an amount of a predetermined angle next to the protruding portion 14c in such a manner as to be recessed in the axial direction from the protruding portion 14c, and a protruding part 14e that greatly protrudes in the axial direction by an amount of a predetermined angle next to the second flat end surface portion 14d.

A length in the axial direction of the inclined end surface portion 14a of the rotating cam portion 14 is selected to be equal to a movement length of the electronic pen main body unit 5 in the axial direction for shifting the pen tip portion 5a of the electronic pen main body unit 5 from a state in which the pen tip portion 5a of the electronic pen main body unit 5 is protected as illustrated in FIG. 3A to a state in which the pen tip portion 5a of the electronic pen main body unit 5 is protruded from the opening 2Kb of the pen tip side casing 2K as illustrated in FIG. 3B. Moreover, lengths (angles) in a circumferential direction of the first flat end surface portion 14b and the second flat end surface portion 14d are set to be sufficient lengths (angular amounts) for a rear end side end surface 4be of a protruding portion 4b of the sliding member 4 to be engaged with and locked to the first flat end surface portion 14b and the second flat end surface portion 14d.

Figure 4C:
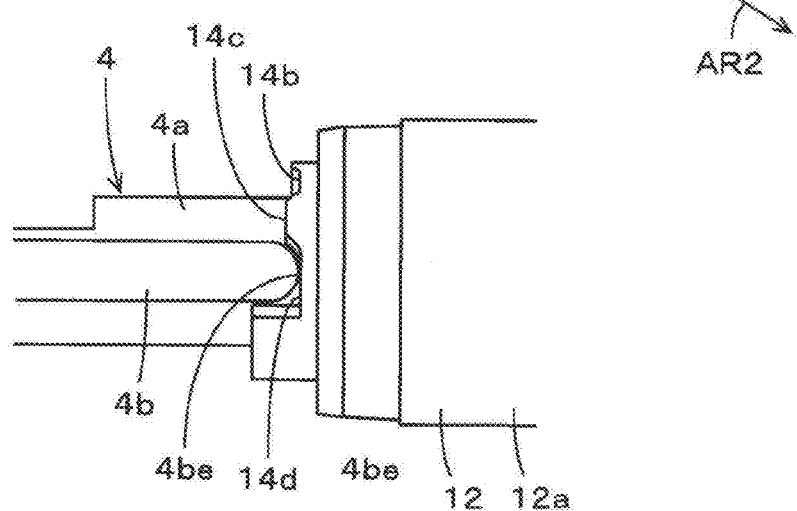

FIG. 4C illustrates a state in which the rear end side end surface 4be of the protruding portion 4b of the sliding member 4 engages with the second flat end surface portion 14d of the rotating cam portion 14 when the rear end side module 3 is rotated by 240 degrees from the initial state with respect to the pen tip side module 2.

Incidentally, the height of the protruding portion 14c of the rotating cam portion 14 is selected to be such a height that the protruding portion 14c cannot be gone over when a user rotates the rear end side module 3 with a small force but the protruding portion 14c can be gone over by application of a predetermined or stronger force. In addition, the protruding part 14e of the rotating cam portion 14 is configured such that the rear end side end surface 4be of the protruding portion 4b of the sliding member 4 cannot go over the protruding part 14e even when the user rotates the rear end side module 3.

As illustrated in FIG. 1, FIG. 2B, and FIG. 4B, the sliding member 4 includes a sliding member main body portion 4a having a configuration corresponding to substantially half the circumference of a tubular body and the protruding portion 4b. The protruding portion 4b is formed at an edge portion of the side circumferential surface of the tubular body corresponding to substantially half the circumference in the sliding member main body portion 4a in such a manner as to extend from an end portion of the pen tip side of the sliding member 4 in the axial direction to a position approximately in a middle in the axial direction and protrude in a direction orthogonal to the axial direction. Moreover, the outside diameter of the sliding member main body portion 4a of the sliding member 4 is set to be slightly smaller than the inside diameter of the front end side portion 12a of the rear end side inner casing 12, and the height in the direction orthogonal to the axial direction of the protruding portion 4b is set to be such a height that the protruding portion 4b engages with the rotating cam portion 14 at an end surface of the front end side portion 12a of the rear end side inner casing 12 and slightly protrudes from the peripheral side surface of the front end side portion 12a of the rear end side inner casing 12.

Hence, as illustrated in FIGS. 4B and 4C, the rear end side end surface 4be of the sliding member 4 engages with the rotating cam portion 14 formed at a front end of the front end side portion 12a of the rear end side inner casing 12 in a state in which a rear end side part of the sliding member main body portion 4a on which part the protruding portion 4b is not present in the axial direction enters the inside of the front end side portion 12a of the rear end side inner casing 12 and the protruding portion 4b slightly protrudes from the peripheral side surface of the front end side portion 12a of the rear end side inner casing 12. Moreover, as described earlier, in a state in which the pen tip side module 2 and the rear end side module 3 are coupled to each other, an end portion on the pen tip side of the sliding member 4 abuts against the rear end portion of the electronic pen main body unit 5.

As illustrated in FIGS. 3A and 3B, in a state in which the pen tip side module 2 and the rear end side module 3 are coupled to each other, the electronic pen main body unit 5 is elastically biased to the rear end side by the coil spring 6 at all times. Thus, in the initial state of FIG. 3A, the rear end side end surface 4be of the protruding portion 4b of the sliding member 4 engages with a part 14as on a rearmost end side of the inclined end surface portion 14a of the rotating cam portion 14.

When the rear end side inner casing 12 is then rotated in the clockwise direction as indicated by an arrow AR1 in FIG. 4B by rotating the rear end side module 3 from the initial state in the clockwise direction about the axial direction with respect to the pen tip side module 2, the sliding member 4 engaging with the rotating cam portion 14 at the part 14as is slidingly moved by the inclined end surface portion 14a of the rotating cam portion 14 in such a manner as to be pushed out in the axial direction indicated by an arrow AR2, within the hollow portion of the coupling member 7.

In this case, a recessed groove 7d (see FIG. 2C) in the axial direction is provided to the inner wall surface of the hollow portion of the coupling member 7, the recessed groove 7d housing a part of the protruding portion 4b of the sliding member 4 which part slightly protrudes from the peripheral surface of the front end side portion 12a of the rear end side inner casing 12 and guiding movement in the axial direction of the sliding member 4. Hence, the sliding member 4 is slidingly moved while maintaining a predetermined angular position without being rotated in the hollow portion of the coupling member 7 of the pen tip side module 2.

When the rear end side inner casing 12 is then rotated by 180 degrees from the initial state, the rear end side end surface 4be of the protruding portion 4b of the sliding member 4 transfers from the inclined end surface portion 14a to the first flat end surface portion 14b of the rotating cam portion 14, and the sliding member 4 is locked. At this time, the electronic pen 1 is in the usable state in which the pen tip portion 5a of the electronic pen main body unit 5 protrudes from the opening 2Kb of the pen tip side casing 2K. Incidentally, in this case, as illustrated in FIG. 3B, not only a front end portion 53a of a core body 53 as the pen tip portion 5a of the electronic pen main body unit 5 but also the pen tip side of a ferrite core 52 protrudes from the opening 2Kb.

The user perceives the transfer of the rear end side end surface 4be of the protruding portion 4b of the sliding member 4 from the inclined end surface portion 14a to the first flat end surface portion 14b of the rotating cam portion 14 as a locking in a clicking manner, which indicates completion of the rotation of 180 degrees from the initial state and a transition from the initial state to the usable state.

Next, in this usable state, when the user further rotates the rear end side module 3 in the clockwise direction with respect to the pen tip side module 2 such that the rear end side end surface 4be of the protruding portion 4b of the sliding member 4 goes over the protruding portion 14c, the rear end side end surface 4be of the protruding portion 4b of the sliding member 4 engages with the second flat end surface portion 14d of the rotating cam portion 14, and the sliding member 4 is locked (see FIG. 4C). In a rotating operation at this time, the user perceives, as a locking in a clicking manner, a transition in which the rear end side end surface 4be of the protruding portion 4b of the sliding member 4 goes over the protruding portion 14c of the rotating cam portion 14 and engages with the second flat end surface portion 14d.

As described earlier, the rear end side end surface 4be of the protruding portion 4b of the sliding member 4 engages with the second flat end surface portion 14d when the rear end side module 3 is rotated from the initial state by a rotational angle of 240 degrees in the clockwise direction with respect to the pen tip side module 2. In the present embodiment, as described earlier, an operation of effecting the rotation by 60 degrees (=240 degrees-180 degrees) from the usable state is configured to be a mode switching operation.

Example of Configuration of Mode Switching Switch

A constituent part for this mode switching will next be described. In the present embodiment, the mode switching is configured to be based on the turning on and off of a mode switching switch. Specifically, as illustrated in FIG. 2B and FIG. 4A, the mode switching switch 15 is provided to the rear end side portion 12b of the rear end side inner casing 12 that is rotated with the rotation of the rear end side module 3.

As illustrated in FIG. 2B and FIG. 4A, the mode switching switch 15 is constituted by a first electrode piece 151 and a second electrode piece 152 formed by two conductive members, or two metallic pieces in the present example, which are provided in a state of being insulated from each other. The first electrode piece 151 has a configuration provided with a fixed contact. The second electrode piece 152 has a configuration provided with a movable contact that turns on the switch by being electrically connected to the fixed contact of the first electrode piece 151 by the rotation of the above-described rear end side module 3 by 60 degrees, as will be described in the following.

As illustrated in FIG. 4A, the first electrode piece 151 is formed by bending a conductive metallic sheet in a hook shape, and one end portion 151a of the first electrode piece 151 that has been bent is electrically connected to the circuit board 100 provided within the rear end side portion 12b, through a through hole 12c formed in the rear end side portion 12b of the rear end side inner casing 12. Moreover, a distal end of another end portion of the first electrode piece 151 is further bent in a hook shape. A fixed contact 151b is formed on the distal end portion.

Meanwhile, the second electrode piece 152 is also similarly formed by bending a conductive metallic sheet into a hook shape, and one end portion 152a of the second electrode piece 152 that has been bent is electrically connected to the circuit board 100 provided within the rear end side portion 12b, through the through hole 12c formed in the rear end side portion 12b of the rear end side inner casing 12. Moreover, a distal end portion of another end portion of the second electrode piece 152 is bent in such manner as to be opposed at a predetermined distance to the fixed contact 151b on the other end portion of the first electrode piece 151, and is formed in an elastically displaceable shape such that the distal end portion of the second electrode piece 152 can come into contact with the fixed contact 151b by being elastically displaced by an external pressing force. Moreover, a movable contact 152b is provided to a part of the second electrode piece 152 which part is opposed to the fixed contact 151b and has the elastically displaceable shape.

In this case, the mode switching switch 15 constituted by the first electrode piece 151 and the second electrode piece 152 is disposed at a predetermined position of the rear end side portion 12b of the rear end side inner casing 12 formed integrally with a front end side portion 12a at which the rotating cam portion 14 is formed. Thus, the mode switching switch 15 is in a fixed positional relation to the rotating cam portion 14 with regard to rotational directions about the axial direction.

Moreover, in the present embodiment, as illustrated in FIG. 1 and FIG. 2C, a predetermined angular position of an end portion of a part of the coupling member 7 which part protrudes from the rear end side of the pen tip side casing 2K is provided with a pressing cam piece 7e that further protrudes in the axial direction from the end portion. The pressing cam piece 7e is provided at such an angular position as to be able to drive the elastically displaceable movable contact 152b of the second electrode piece 152 of the mode switching switch 15 by a distal end portion in the axial direction of the pressing cam piece 7e and thereby bring the fixed contact 151b of the first electrode piece 151 and the movable contact 152b of the second electrode piece 152 into electric contact with each other.

That is, in the present embodiment, the protruding portion 4b of the sliding member 4 is configured to be slid while guided by the recessed groove 7d of the coupling member 7. Hence, the angular position in the circumferential direction of the protruding portion 4b of the sliding member 4 is fixed to be constant according to the position of the recessed groove 7d of the coupling member 7. Moreover, as described earlier, the protruding portion 4b of the sliding member 4 and the rotating cam portion 14 engage with each other. Thus, the angular position in the circumferential direction of each part of the rotating cam portion 14 is configured to be determined by the position of the protruding portion 4b of the sliding member 4.

From the above, the positional relation in the circumferential direction (rotational direction) in the initial state at a time at which the rear end side module 3 is coupled to the pen tip side module 2 is determined with the circumferential position of the recessed groove 7d within the hollow portion of the coupling member 7 as a reference. Accordingly, the angular position in the circumferential direction of the pressing cam piece 7e formed on the coupling member 7 is determined with the circumferential position of the recessed groove 7d of the coupling member 7 as a reference.

In this case, the pressing cam piece 7e formed on the coupling member 7 is set in such a circumferential position (rotational direction angular position) as to elastically press the movable contact 152b of the second electrode piece 152 of the mode switching switch 15 and thereby bring the movable contact 152b into electric contact with the fixed contact 151b of the first electrode piece 151 when the rear end side module 3 is rotated by 240 degrees with respect to the pen tip side module 2 from the initial state at the time at which the rear end side module 3 is coupled to the pen tip side module 2.

Incidentally, the size of the pressing cam piece 7e is set to be such a size that the pressing cam piece 7e is able to drive the elastically displaceable movable contact 152b of the second electrode piece 152 of the mode switching switch 15 by the distal end portion in the axial direction of the pressing cam piece 7e and thereby bring the fixed contact 151b of the first electrode piece 151 and the movable contact 152b of the second electrode piece 152 into electric contact with each other.

FIGS. 5A to 5E, FIG. 6, and FIG. 7 are views of assistance in explaining a manner in which, as a result of the rotation of the rear end side inner casing 12 with the rotation of the rear end side module 3, the pressing cam piece 7e of the coupling member 7 turns on the mode switching switch 15 provided to the rear end side inner casing 12.

FIG. 5A is a view illustrating the positional relation between the rear end side inner casing 12 and the coupling member 7 at a time at which the electronic pen 1 is in the initial state (see FIG. 3A). Because the mode switching switch 15 and the pressing cam piece 7e of the coupling member 7 are displaced from each other by an amount of a rotational angle of 260 degrees, the pressing cam piece 7e does not appear in this figure. At this time, the rotating cam portion 14 of the front end side portion 12a of the rear end side inner casing 12 is present within the coupling member 7, and the sliding member 4 is positioned on the rearmost end side in the electronic pen 1.

When the user rotates the rear end side module 3 in the clockwise direction by 180 degrees from the initial state, the positional relation between the rear end side inner casing 12 and the coupling member 7 becomes a positional relation as illustrated in FIG. 5B and FIG. 5C. That is, FIG. 5B illustrates a state in which the rear end side inner casing 12 is rotated by 180 degrees from the initial state of FIG. 5A. In addition, FIG. 5C is a view of the state at this time as viewed from an angle side different by 180 degrees where the switch 15 is disposed.

As illustrated in FIGS. 5B and 5C, at this time, the sliding member 4 is moved in the axial direction by engagement thereof with the rotating cam portion 14 at the front end of the front end side portion 12a of the rear end side inner casing 12 to move the electronic pen main body unit 5 in a pen tip direction within the pen tip side casing 2K, and the electronic pen 1 is set in the usable state (see FIG. 3B) in which the pen tip portion 5a of the electronic pen main body unit 5 protrudes from the opening 2Kb of the pen tip side casing 2K.

Figure 6:
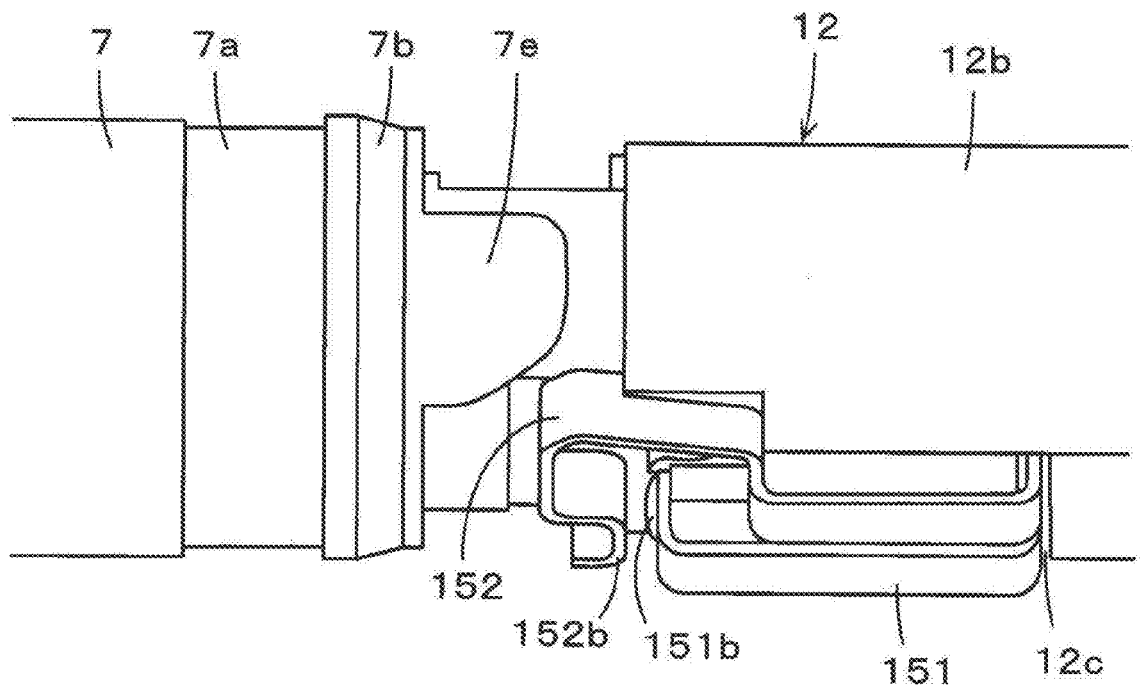
FIG. 6 is a diagram of assistance in explaining the example of the configuration for turning on the switch when the second casing is rotated with respect to the first casing in the electronic pen according to the first embodiment of the present disclosure.

Moreover, in this usable state, as illustrated in FIG. 5C, the pressing cam piece 7e of the coupling member 7 is not at a position of engaging with the mode switching switch 15, and the mode switching switch 15 remains off. FIG. 6 is an enlarged view of assistance in explaining the positional relation between the mode switching switch 15 and the pressing cam piece 7e of the coupling member 7 at this time. It is to be noted that, in FIG. 6, the positional relation in the axial direction between the front end side portion 12a of the rear end side inner casing 12 and the coupling member 7 is horizontally opposite to that of FIG. 5C.

As illustrated in FIG. 6, in the usable state of the electronic pen 1, the pressing cam piece 7e of the coupling member 7 and the mode switching switch 15 are separated from each other by an angle of 60 degrees. Therefore, the movable contact 152b of the second electrode piece 152 of the mode switching switch 15 is not in contact with the fixed contact 151b of the first electrode piece 151, and the mode switching switch 15 remains off.

When the user further rotates the rear end side module 3 in the clockwise direction by 60 degrees from the usable state, the positional relation between the rear end side inner casing 12 and the coupling member 7 becomes a positional relation as illustrated in FIG. 5D and FIG. 5E. That is, FIG. 5D illustrates a state in which the rear end side inner casing 12 is rotated by 60 degrees from the usable state of FIG. 5C. In addition, FIG. 5E is a view of the state at this time as viewed from the angle side different by 180 degrees where the mode switching switch 15 is disposed.

As illustrated in FIGS. 5D and 5E, at this time, due to the engagement with the rotating cam portion 14 at the front end of the front end side portion 12a of the rear end side inner casing 12, the sliding member 4 is not moved in the axial direction except when the sliding member 4 goes over the protruding portion 14c of the rotating cam portion 14, and the electronic pen 1 maintains the usable state (see FIG. 3B) in which the pen tip portion 5a of the electronic pen main body unit 5 protrudes from the opening 2Kb of the pen tip side casing 2K.

Figure 7:
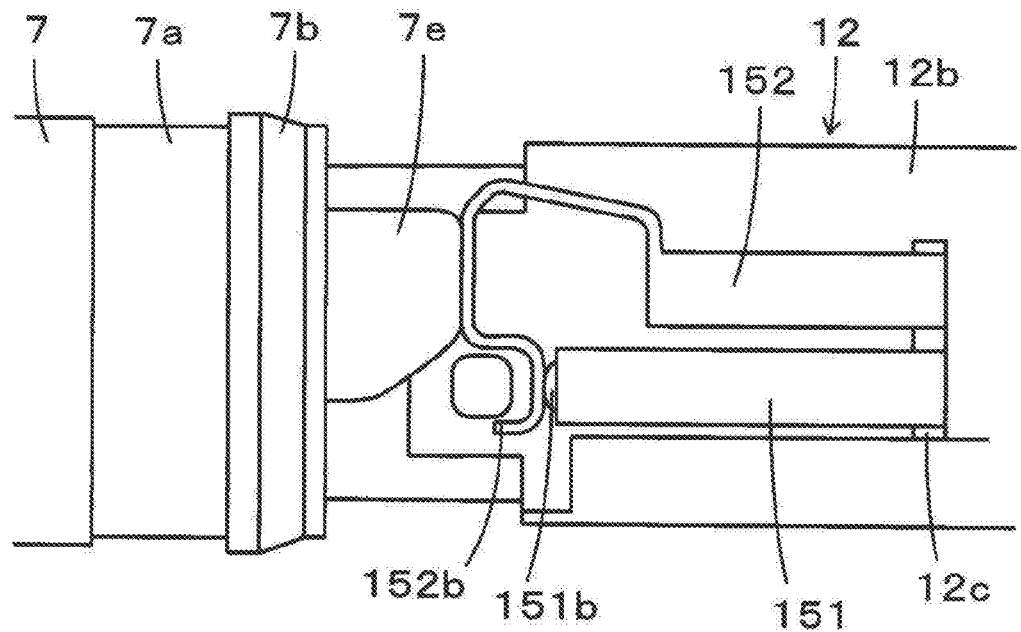
FIG. 7 is a diagram of assistance in explaining the example of the configuration for turning on the switch when the second casing is rotated with respect to the first casing in the electronic pen according to the first embodiment of the present disclosure.

Moreover, in this state, as illustrated in FIG. 5E, the pressing cam piece 7e of the coupling member 7 is at a position of engaging with the mode switching switch 15, and the mode switching switch 15 is on. FIG. 7 is an enlarged view of assistance in explaining the positional relation between the mode switching switch 15 and the pressing cam piece 7e of the coupling member 7 at this time. It is to be noted that, in FIG. 7, the positional relation in the axial direction between the front end side portion 12a of the rear end side inner casing 12 and the coupling member 7 is horizontally opposite to that of FIG. 5E.

As illustrated in FIG. 7, in a state in which the rear end side module 3 is rotated by 240 degrees from the initial state of the electronic pen 1, the pressing cam piece 7e of the coupling member 7 engages with the second electrode piece 152 of the mode switching switch 15, and elastically presses the movable contact 152b of the second electrode piece 152. Therefore, as illustrated in FIG. 7, the movable contact 152b of the second electrode piece 152 of the mode switching switch 15 is in contact with the fixed contact 151b of the first electrode piece 151, and the mode switching switch 15 is on. In the present embodiment, as will be described later, the switching of the mode switching switch 15 to an on state is assumed to be the switching of the operation mode of the electronic pen 1.

Incidentally, when the rear end side module 3 is rotated in the counterclockwise direction by 60 degrees with respect to the pen tip side module 2 from the state illustrated FIGS. 5D and 5E, the engagement between the pressing cam piece 7e of the coupling member 7 and the second electrode piece 152 of the mode switching switch 15 is released. Thus, the mode switching switch 15 is returned to an off state, and the operation mode is returned to an original state. At this time, the electronic pen 1 is in the usable state illustrated in FIGS. 5B and 5C.

When the rear end side module 3 is then rotated in the counterclockwise direction by 180 degrees with respect to the pen tip side module 2 from the usable state of the electronic pen 1, the electronic pen 1 is returned to the initial state illustrated in FIG. 5A and FIG. 3A.

Example of Configuration of Electric Parts of Electronic Pen 1

A configuration of electric parts of the electronic pen 1 according to the present embodiment will next be described. Description will first be made of electric parts arranged on the circuit board 50 provided within the electronic pen main body unit 5.

As described above, the circuit board 50 disposed within the electronic pen main body unit 5 is provided with an electronic circuit including a circuit for performing signal interaction with the position detecting sensor. The electronic pen 1 according to the present embodiment is an electronic pen of an electromagnetic induction system. As illustrated in FIGS. 3A and 3B, a ferrite core 52 as an example of a magnetic core wound with a coil 51 is disposed on the pen tip side within the main body unit casing 5K of the electronic pen main body unit 5.

The circuit board 50 is provided with a capacitor 54 (see FIGS. 3A and 3B) that forms a resonance circuit together with the coil 51. Both terminals of the coil 51 are connected to a conductive pattern of the circuit board 50 to which both terminals of the capacitor 54 are connected.

As illustrated in FIGS. 3A and 3B, a through hole is provided in the ferrite core 52, and the core body 53 formed of resin, for example, is provided in such a manner as to be movable in the axial direction through the through hole. The front end portion 53a of the core body 53 protrudes to the outside from an opening on the pen tip side of the main body unit casing 5K. Moreover, the rear end side of the core body 53 is fitted into a fitting portion 55a of a pen pressure detecting unit 55 provided on the rear end side of the ferrite core 52.

The pen pressure detecting unit 55 is constituted by a well-known pen pressure detecting unit that detects, as a change in capacitance in the present example, a displacement in the axial direction of the core body 53 which displacement corresponds to a pen pressure applied to the front end portion 53a of the core body 53. A specific configuration of the pen pressure detecting unit 55 in the present example is well known, and is therefore not illustrated in the figures. However, the pen pressure detecting unit 55 is constituted by a variable capacitance capacitor whose capacitance is changed by a change in an area of contact between a dielectric and a conductive elastic member according to an applied pressure (see, for example, Japanese Patent Laid-Open No. 2016-126503 and the like). Incidentally, the pen pressure detecting unit 55 that detects the pen pressure on the basis of the capacitance may be constituted by a pen pressure detecting unit formed by a semiconductor device in which a distance between two electrodes opposed to each other with an air layer as a dielectric interposed therebetween changes according to the applied pressure (see, for example, Japanese Patent Laid-Open No. 2013-161307 and the like).

A first electrode and a second electrode of the variable capacitance capacitor formed in the pen pressure detecting unit 55 are connected to the conductive pattern of the circuit board 50.

Moreover, in the present example, on the circuit board 50, two side switches 56A and 56B are provided in such a manner as to be aligned with each other in the axial direction. As is well known, operations of turning on and off the side switches 56A and 56B are set in such a manner as to be associated with, for example, a predetermined function such as a function corresponding to a mouse pointer clicking operation in an electronic apparatus including the position detecting sensor that performs signal interaction with the electronic pen 1.

The side switches 56A and 56B in the present example are push-button switches. Though not illustrated in the figures, the side switches 56A and 56B are constituted by switches that alternately repeat on and off each time depression operating elements thereof that protrude upward when the switches are arranged on the circuit board 50 are depressed. The depression operating elements of the side switches 56A and 56B automatically and elastically restore themselves when a depression force disappears.

In the axial direction of the main body unit casing 5K of the electronic pen main body unit 5, a rectangular through hole 5Kb (see FIG. 2A) through which the side switches 56A and 56B can be seen from the outside is formed at a position above a position at which the side switches 56A and 56B are arranged. Moreover, within the rectangular through hole 5Kb, a depressing operation transmitting member 57 for transmitting operations of depressing a switch operating portion to be described later to the depression operating elements of the side switches 56A and 56B is disposed in an exposed state in such a manner as to be capable of receiving external depressing operations.

The depressing operation transmitting member 57 in the present example is constituted by one member in such a manner as to allow an operation of turning on or off any one of the two side switches 56A and 56B by seesaw movement. Specifically, as illustrated in FIGS. 3A and 3B, the depressing operation transmitting member 57 includes a rectangular plate-shaped body portion slightly smaller than the through hole 5Kb of the main body unit casing 5K of the electronic pen main body unit 5, and also includes, below the plate-shaped body portion in a direction orthogonal to the plate surface of the plate-shaped body portion, a fulcrum leg portion 57c serving as a fulcrum of the seesaw movement, a depressing leg portion 57a for depressing the side switch 56A, and a depressing leg portion 57b for depressing the side switch 56B.

In this case, the fulcrum leg portion 57c is disposed at a central position in the longitudinal direction (axial direction) and the short-side direction of the plate-shaped body portion of the depressing operation transmitting member 57. In addition, the depressing leg portion 57a is provided such that a distal end portion thereof depresses the depression operating element of the side switch 56A, and the depressing leg portion 57b is provided such that a distal end portion thereof depresses the depression operating element of the side switch 56B. Incidentally, the depressing leg portions 57a and 57b are set in a state of being elastically biased upward by the depression operating elements of the side switches 56A and 56B at all times.

On the other hand, a rectangular through hole 2Kc is provided at an axial direction position of the peripheral side surface of the pen tip side casing 2K to which position the through hole 5Kb of the main body unit casing 5K corresponds when the electronic pen main body unit 5 is housed in the pen tip side casing 2K. Moreover, as illustrated in FIG. 1, FIG. 2C, and FIGS. 3A and 3B, a switch operating portion 9 for the user to depress the side switches 56A and 56B via the depressing operation transmitting member 57 is disposed in the through hole 2Kc of the pen tip side casing 2K. As illustrated in FIG. 2C and FIGS. 3A and 3B, the switch operating portion 9 is formed by a plate-shaped body slightly smaller than the rectangular through hole 2Kc of the pen tip side casing 2K, is disposed in such a manner as to overlap the plate-shaped body portion of the depressing operation transmitting member 57, and is configured to be able to perform seesaw movement with a fulcrum portion 9a as a fulcrum.

Moreover, the switch operating portion 9 includes pairs of elastically displaceable pawl portions 9b and 9c at both ends in the short-side direction at and in the vicinities of the positions of both ends in the long-side direction of the switch operating portion 9. Further, elastic displacement of the two pairs of pawl portions 9b and 9c prevents the switch operating portion 9 from being easily detached from the rectangular through hole 2Kc. The plate-shaped body portion of the depressing operation transmitting member 57 is smaller than the plate-shaped body of the switch operating portion 9, and has such a size as to be inserted between the pairs of pawl portions 9b and 9c in the width direction of the switch operating portion 9.

When the electronic pen main body unit 5 is inserted into the pen tip side casing 2K from the rear end side, the electronic pen main body unit 5 is inserted such that the through hole 2Kc of the pen tip side casing 2K is positioned above the through hole 5Kb of the main body unit casing 5K.

However, as illustrated in FIG. 3A, in the initial state in which the pen tip portion 5a of the electronic pen main body unit 5 does not protrude from the pen tip side casing 2K, the position of the through hole 5Kb of the main body unit casing 5K and the position of the through hole 2Kc of the pen tip side casing 2K are displaced from each other in the axial direction such that depressing operation by the switch operating portion 9 is disabled.

Specifically, in the initial state illustrated in FIG. 3A, the main body unit casing 5K of the electronic pen main body unit 5 is present directly under an end portion on the pen tip side in the longitudinal direction of the switch operating portion 9, and the fulcrum leg portion 57c of the depressing operation transmitting member 57 is present directly under the rear end side in the longitudinal direction of the switch operating portion 9, disabling an operation of depressing the switch operating portion 9.

As illustrated in FIG. 3B, when the electronic pen 1 is then set in the usable state in which the pen tip portion 5a of the electronic pen main body unit 5 protrudes from the pen tip side casing 2K, the position of the fulcrum 9a of the switch operating portion 9 and the position of the fulcrum leg portion 57c of the depressing operation transmitting member 57 coincide with each other in the axial direction. When the pen tip side of the fulcrum 9a of the switch operating portion 9 is then depressed, the depressing operation is transmitted to the depressing leg portion 57a of the depressing operation transmitting member 57, and the side switch 56A is turned on. In addition, when the rear end side of the fulcrum 9a of the switch operating portion 9 is depressed, the depressing operation is transmitted to the depressing leg portion 57b of the depressing operation transmitting member 57, and the side switch 56B is turned on.

In the electronic pen 1 according to the present embodiment, information regarding on/off operations of the side switches 56A and 56B is transmitted, as changes in resonance frequency of the resonance circuit of the electronic pen main body unit 5, to the position detecting sensor.

Moreover, in the present embodiment, a battery 58 as a power supply is housed on the rear end side of the main body unit casing 5K of the electronic pen main body unit 5. The battery 58 in the present example is a secondary battery (rechargeable battery). As will be described later, a charging circuit for the battery 58 is provided to the circuit board 50.

The circuit board 50 is also provided with a control circuit, and is mounted with an identification (ID) memory storing identification information of the electronic pen main body unit 5 and other electronic parts.

Description will next be made of electric parts arranged on the circuit board 100 provided within the rear end side inner casing 12.

In the present embodiment, as described earlier, the mode switching is performed by changing the resonance frequency of the resonance circuit of the electronic pen 1 of the electromagnetic induction system. Therefore, in the present embodiment, the circuit board 100 is provided with a capacitor 101 whose connection to the resonance circuit of the electronic pen main body unit 5 is controlled by the mode switching switch 15. In addition, in the present embodiment, the circuit board 100 is provided with a wireless communication unit 102 for wirelessly transmitting information regarding a pen pressure value detected by the electronic pen main body unit 5 and the identification information stored in the ID memory of the electronic pen main body unit 5 to the outside, for example, an electronic device including a position detecting sensor. The wireless communication unit 102 is constituted by a wireless communication unit that performs short-range wireless communication of a Bluetooth (registered trademark) standard, for example.

In addition, as illustrated in FIGS. 3A and 3B, in the present embodiment, a universal serial bus (USB) terminal 16 (see FIG. 2B) is provided as an example of an external connection terminal to the rear end side of the rear end side inner casing 12. The USB terminal 16 is electrically connected to the circuit board 100. The USB terminal 16 is held by a USB terminal holding member 17 provided to the rear end side of the rear end side inner casing 12, in a state in which a connector jack of the USB terminal 16 can be exposed to the outside. Incidentally, as illustrated in FIGS. 3A and 3B, the connector jack of the USB terminal 16 exposed on the rear end side of the rear end side casing 3K is closed by the rear end side cap 18 (see FIG. 2C). When the rear end side cap 18 is removed, the connector jack of the USB terminal 16 is exposed to the outside.

Figure 8:
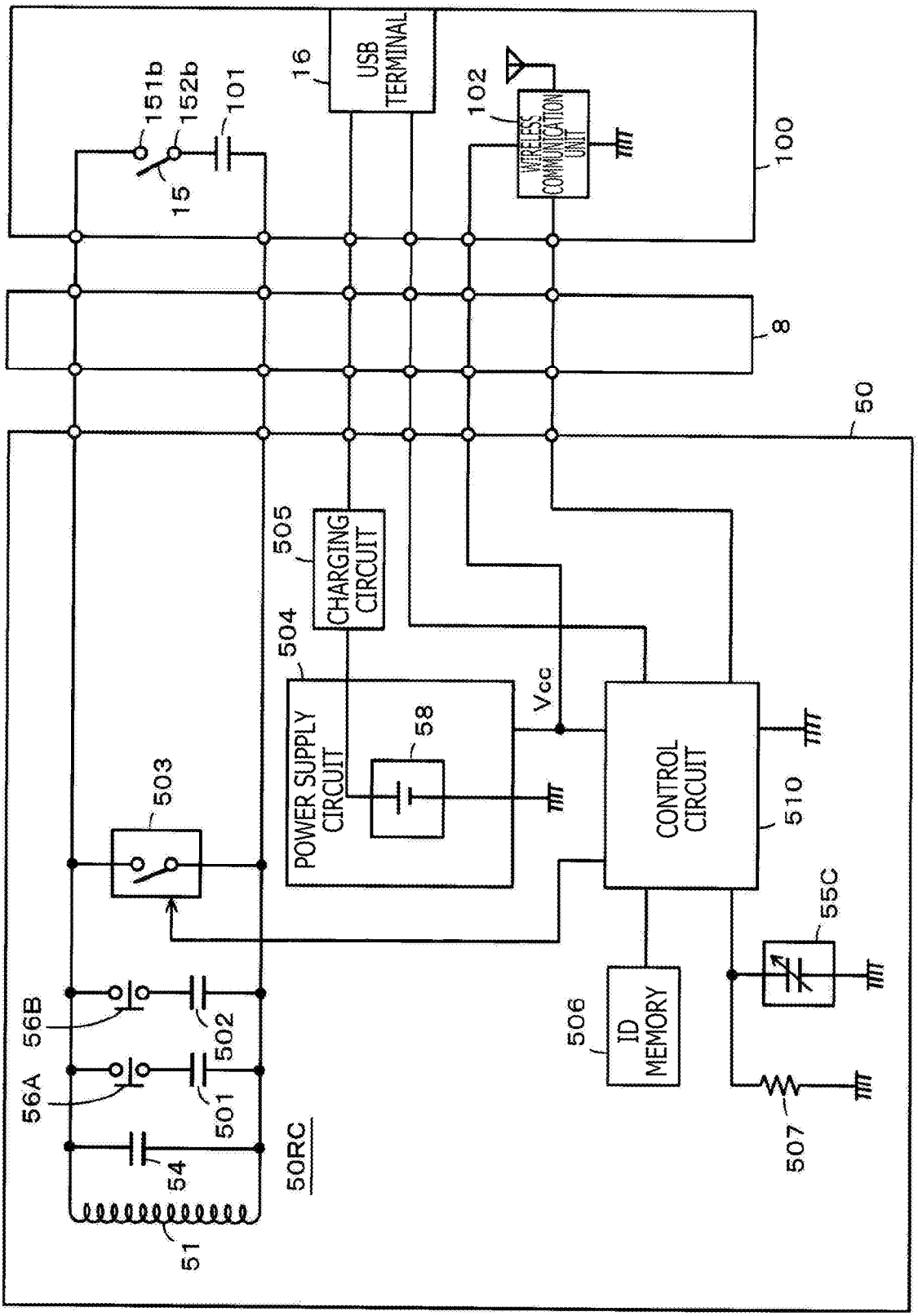
FIG. 8 is a block diagram of assistance in explaining an example of an electronic circuit configuration of the electronic pen according to the first embodiment of the present disclosure.

Example of Configuration of Electronic Circuit of Electronic Pen 1 According to Embodiment FIG. 8 is a block diagram illustrating an example of an electronic circuit configuration of the electronic pen 1 described above. As illustrated in FIG. 8, for the electronic circuit of the electronic pen 1, the circuit board 50 provided within the electronic pen main body unit 5 within the pen tip side module 2 and the circuit board 100 provided within the rear end side inner casing 12 of the rear end side module 3 are connected to each other via the flexible cable 8.

On the circuit board 50, a resonance circuit 50RC is formed by connecting the coil 51 and the capacitor 54 in parallel with each other. Moreover, in the present embodiment, the turning on of the side switches 56A and 56B is detected on a position detecting device side as a change in the resonance frequency of the resonance circuit 50RC. To this end, capacitors 501 and 502 are arranged on the circuit board 50, a series circuit of the side switch 56A and the capacitor 501 is connected in parallel with the coil 51, and a series circuit of the side switch 56B and the capacitor 502 is connected in parallel with the coil 51.

In addition, on the circuit board 50, a switch circuit 503 for controlling the on/off states of resonance operation of the resonance circuit 50RC is connected in parallel with the coil 51.

In addition, in the electronic pen 1 according to the present embodiment, a control circuit 510 constituted by an integrated circuit (IC), for example, is provided to the circuit board 50. Moreover, the circuit board 50 is provided with a power supply circuit 504 for generating a power supply voltage Vcc from the voltage of the battery 58, a charging circuit 505 for the battery 58, and an ID memory 506 storing the identification information of the electronic pen main body unit 5. The ID memory 506 is constituted by a nonvolatile memory.

Moreover, the power supply voltage Vcc from the power supply circuit 504 is supplied to the control circuit 510 and each of parts that need the power supply voltage. The control circuit 510 is connected with the ID memory 506, and is also connected with a variable capacitance capacitor 55C constituted by the pen pressure detecting unit 55. The variable capacitance capacitor 55C is connected with a resistor 507 for discharge. In addition, the control circuit 510 supplies a switching control signal to the switch circuit 503, and thereby performs on-off control of the switch circuit 503.

The control circuit 510 in the present embodiment detects the capacitance of the variable capacitance capacitor 55C by measuring a discharge time from a full charge of the variable capacitance capacitor 55C. The control circuit 510 thereby detects the pen pressure. Moreover, in the present example, the control circuit 510 converts the value of the detected pen pressure into a digital signal, and performs switching control of the switch circuit 503 by the digital signal. The control circuit 510 thereby interrupts the resonance operation of the resonance circuit 50RC. The control circuit 510 thus transmits the digital information of the pen pressure value as an amplitude shift keying (ASK) modulated signal or an on off keying (OOK) modulated signal to the position detecting device through the position detecting sensor.

Incidentally, instead of transmitting, to the position detecting sensor side, the information regarding the pen pressure value as digital information as in the present example, it is also possible to transmit, to the position detecting sensor side, the information regarding the pen pressure value as a change in the resonance frequency of the resonance circuit 50RC by connecting the variable capacitance capacitor 55C in parallel with the coil 51 of the resonance circuit 50RC.

Meanwhile, the circuit board 100 is provided with a series circuit of the capacitor 101 and the mode switching switch 15. One terminal and another terminal of the series circuit of the capacitor 101 and the mode switching switch 15 are connected in parallel with the coil 51 of the resonance circuit 50RC on the circuit board 50 via the flexible cable 8. Hence, when the mode switching switch 15 is turned on by rotating the rear end side module 3 by 240 degrees with respect to the pen tip side module 2, the capacitor 101 is connected to the resonance circuit 50RC, and the resonance frequency changes.

In the present embodiment, the position detecting device receives the signal from the electronic pen 1 via the position detecting sensor, and detects a change in the frequency of the received signal (resonance frequency). The position detecting device thereby detects that a mode switching operation has been performed in the electronic pen 1. Incidentally, a mode switched by the mode switching in the electronic pen 1 is determined in advance in the position detecting device or the electronic apparatus including the position detecting device. The switched mode in this case may be fixedly determined. Alternatively, assignable several modes may be prepared in advance, and the switched mode may be selected and set in advance from among these modes.

In this case, as examples of the switched mode, the following are possible:
 switching between a writing mode and an erasing mode
 changing a writing color (from black to red, for example)
 changing the thickness of a writing line
 changing a kind of a writing line (for example, a solid line, a broken line, alternate long and short dashed lines, a chain double-dashed line, or the like)

The USB terminal 16 provided to the circuit board 100 has functions of a USB interface. A charging current externally supplied through the USB terminal 16 when an external USB connector plug is fitted to the USB connector jack is supplied from the circuit board 100 through the flexible cable 8 to the charging circuit 505. In addition, a communication path of signals transmitted and received to and from the outside through the USB terminal 16 is formed as a communication path including the USB terminal 16 on the circuit board 100, the flexible cable 8, and the control circuit 510 on the circuit board 50.

In addition, in the present embodiment, the power supply voltage Vcc from the power supply circuit 504 on the circuit board 50 is supplied, via the flexible cable 8, to the wireless communication unit 102 provided to the circuit board 100.

Moreover, in the present embodiment, the identification information of the electronic pen main body unit 5 from the control circuit 510 on the circuit board 50 is supplied to the wireless communication unit 102 on the circuit board 100 via the flexible cable 8. Hence, the wireless communication unit 102 in the present embodiment operates to wirelessly transmit the identification information of the electronic pen main body unit 5 to the position detecting device configured to be capable of wireless communication with the wireless communication unit 102 or the electronic apparatus including the position detecting device, on the basis of a control instruction of the control circuit 510.

Incidentally, instead of transmitting the identification information of the electronic pen main body unit 5 through the wireless communication unit 102, as with the information regarding the pen pressure value, the identification information of the electronic pen main body unit 5 may also be transmitted as an ASK modulated signal or an OOK modulated signal to the position detecting device through the position detecting sensor. In addition, the information regarding the pen pressure value and information regarding the on/off states of the side switches 56A and 56B may be wirelessly transmitted to the position detecting device or the electronic apparatus including the position detecting device through the wireless communication unit 102.

Moreover, in the present embodiment, the control circuit 510 receives a signal from an external device such as the position detecting device through the wireless communication unit 102, and thereby performs, for example, timing control of the interaction of a signal for position detection or the like through the resonance circuit 50RC with the position detecting sensor provided to the external device such as the position detecting device.

Effects Produced by Electronic Pen 1 According to Embodiment

In the electronic pen 1 according to the foregoing embodiment, the rear end side module 3 is coupled in a rotatable state to the pen tip side module 2, the electronic pen main body unit 5 including the first circuit board 50 is housed within the pen tip side module 2, and the second circuit board 100 is housed in the rear end side module 3. Moreover, the first circuit board 50 within the pen tip side module 2 and the second circuit board 100 in the rear end side module 3 are electrically connected to each other by the flexible cable 8.

Since a circuit board is divided into the first circuit board 50 in the pen tip side module 2 and the second circuit board 100 in the rear end side module 3 as described above, a circuit part for a function to be added to the electronic pen main body unit 5 can be formed on the second circuit board 100 side, and the electronic pen 1 can be constructed by using an existing circuit board as it is or slightly reworking the existing circuit board as the first circuit board 50 of the electronic pen main body unit 5. Hence, the electronic pen main body unit 5 can be used in the electronic pen 1 as it is or after being slightly reworked.

Moreover, the electronic pen 1 according to the foregoing embodiment is configured such that a predetermined instruction by the user, that is, an operation of protruding or retracting the electronic pen main body unit 5 or an operation for the mode switching of the electronic pen 1, is performed by rotating a second casing about the axial direction of a first casing with respect to the first casing. Thus, a knock operation mechanism or a new operating unit such as a push-button switch for a mode switching operation is rendered unnecessary.

Moreover, in the electronic pen 1 according to the foregoing embodiment, the first circuit board 50 in the pen tip side module 2 and the second circuit board 100 in the rear end side module 3 are electrically connected to each other by the flexible cable 8, and the flexible cable 8 is disposed in a state of having the surplus portion 8a that can be extended or contracted in the axial direction and can be twisted in rotational directions about the axial direction.

Hence, even when the rear end side module 3 is rotated about the axial direction with respect to the pen tip side module 2, a displacement caused to the flexible cable 8 by the rotation is accommodated by the part of the surplus portion 8a. Thus, the electric connection state is maintained stably without an overload being applied to connecting portions between the flexible cable 8 and the first circuit board 50 and between the flexible cable 8 and the second circuit board 100.

In addition, the electronic pen 1 according to the foregoing embodiment is configured such that the rotating cam portion 14 is formed at the pen tip side end portion of the rear end side inner casing 12 housed within the rear end side casing 3K of the rear end side module 3, and such that the sliding member 4 is slidingly moved in the axial direction by the rotating cam portion 14. There are consequently advantages of simplifying the configuration of the mechanism for protruding and retracting the pen tip portion 5a of the electronic pen main body unit 5 from and into the pen tip side casing 2K of the pen tip side module 2 and obviating a need for special parts for protruding and retracting the pen tip portion 5a of the electronic pen main body unit 5.

Another Example of Electronic Circuit of Electronic Pen

In the electronic pen 1 according to the foregoing embodiment, the switch 15 provided to the rear end side inner casing 12 of the rear end side module 3 is assumed to be a switch for mode switching. However, the switch 15 may be configured to be a switch that controls activation of the operation of interaction of the electronic pen with the position detecting sensor and non-activation of the interaction operation (stopped state of the interaction operation).

Figure 9:
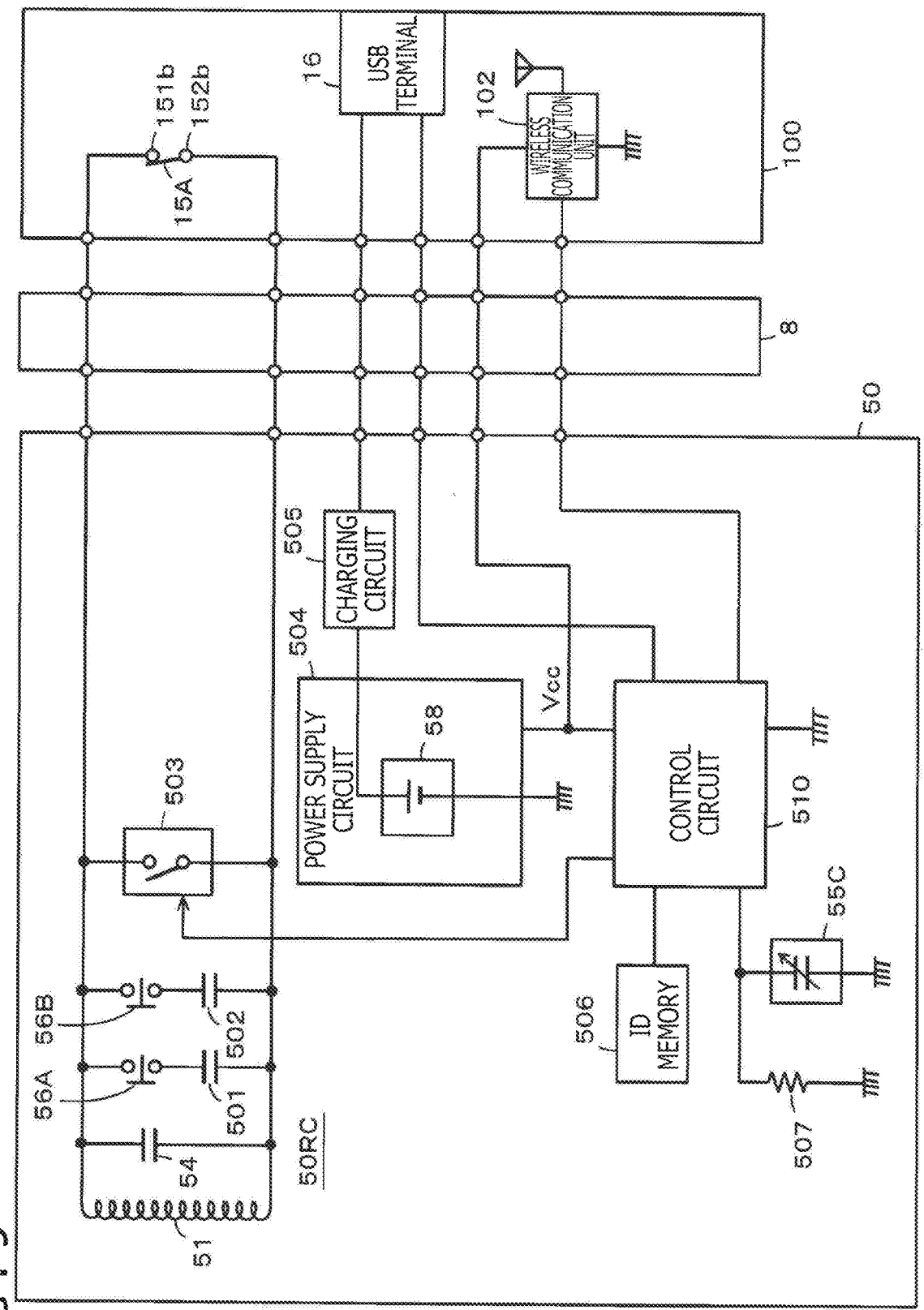
FIG. 9 is a block diagram of assistance in explaining an example of an electronic circuit configuration of an electronic pen according to a second embodiment of the present disclosure.

FIG. 9 is a diagram illustrating an example of an electronic circuit configuration in a case where a switch 15A provided to the rear end side inner casing 12 of the rear end side module 3 is used as a switch that performs switching control of activation and non-activation of the operation of interaction of an electronic pen with the position detecting sensor in the case of the electronic pen of the electromagnetic induction system as in the foregoing embodiment.

In the present example, the switch 15A has a configuration similar to that of the switch 15 according to the foregoing embodiment. However, the switch 15A is configured to be in an on state in the initial state of the electronic pen, and to be in an off state in the usable state. This configuration can be realized by changing the positional relation in the circumferential direction (rotational direction of the rear end side module 3) between the pressing cam piece 7e of the coupling member 7 and the switch 15A from that of the electronic pen 1 according to the foregoing embodiment.

Specifically, the switch 15A is configured to be on in the initial state of the electronic pen by engaging the pressing cam piece 7e of the coupling member 7 with the switch 15a and thereby holding the movable contact 152b in contact with the fixed contact 151b. The switch 15A is configured to, when the rear end side module 3 is then rotated by 180 degrees from the initial state and the usable state is thereby set, be off by setting the pressing cam piece 7e of the coupling member 7 in a state of not being engaged with the switch 15a and thereby separating the movable contact 152b and the fixed contact 151b from each other.

As illustrated in FIG. 9, in the present example, the switch 15A on the circuit board 100 side is configured to be connected in parallel with the coil 51 of the resonance circuit 50RC of the circuit board 50 via the flexible cable 8. Otherwise, the example of the electronic circuit configuration in FIG. 9 is similar to the example of the electronic circuit configuration in FIG. 8.

In the example of FIG. 9, in the initial state of the electronic pen in which the switch 15A is on, both terminals of the coil 51 of the resonance circuit 50RC are short-circuited, and therefore, the resonance circuit 50RC stops resonance operation. Then, in the usable state of the electronic pen in which the switch 15A is set in an off state, the resonance circuit 50RC starts the resonance operation, and the electronic pen performs signal interaction with the position detecting sensor.

Incidentally, also in the example of FIG. 9, it is possible to adopt a configuration in which the switch 15 is provided in addition to the switch 15A in order to perform the mode switching by rotating the rear end side module 3 by 180 degrees+60 degrees with respect to the pen tip side module 2. Alternatively, a configuration in which only the switch 15A is provided while the switch 15 is omitted may be adopted. In this case, it suffices for the rear end side module 3 to be configured to be capable of rotation by only 180 degrees with respect to the pen tip side module 2.

Figure 10:
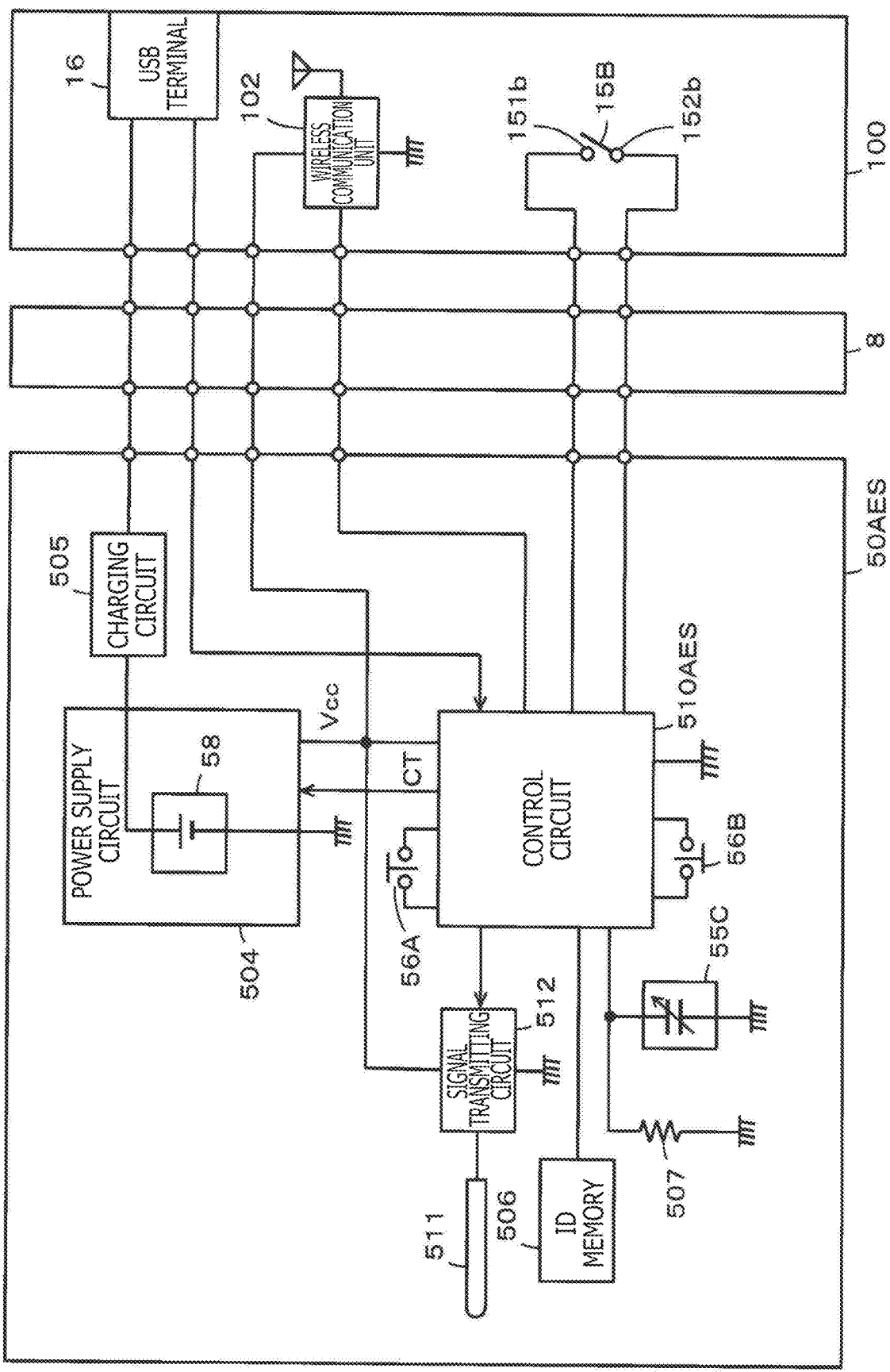
FIG. 10 is a block diagram of assistance in explaining an example of an electronic circuit configuration of an electronic pen according to a third embodiment of the present disclosure.

Next, FIG. 10 is a diagram illustrating an example of an electronic circuit configuration in a case where a switch 15B provided to the rear end side inner casing 12 of the rear end side module 3 is used as a switch that performs switching control of activation and non-activation of the operation of interaction of an electronic pen with the position detecting sensor in a case of an electronic pen of an active capacitive system.

Incidentally, in the example of the electronic circuit configuration of the electronic pen of the active capacitive system in the example of FIG. 10, parts that can be configured to be similar to those of the electronic pen 1 of the above-described electromagnetic induction system will be described with the reference numerals in the foregoing embodiment given thereto as they are in order to facilitate description.

The electronic pen of the active capacitive system in the present example includes a core body 511 formed by a conductive member and a signal transmitting circuit 512 in place of the resonance circuit 50RC. Moreover, in the present example, a control circuit 510AES for the electronic pen of the active capacitive system is provided. The signal transmitting circuit 512 receives a control signal from the control circuit 510AES, and transmits a signal of a predetermined frequency. The signal transmitting circuit 512 also modulates the signal to be transmitted, on the basis of the control signal from the control circuit 510AES.

In the present example, the control circuit 510AES is connected with the ID memory 506, and is also connected with the variable capacitance capacitor 55C formed by the pen pressure detecting unit 55 and the resistor 507 for discharge. As in the foregoing embodiment, the control circuit 510AES has a function of detecting the capacitance of the variable capacitance capacitor 55C by measuring a discharge time from a full charge of the variable capacitance capacitor 55C, and detecting a pen pressure value from the detected capacitance.

In addition, in the present example, the side switches 56A and 56B are connected to the control circuit 510AES, and the control circuit 510AES is configured to detect the on/off states of the side switches 56A and 56B.

Moreover, in the present example, the fixed contact 151b and the movable contact 152b of the switch 15B provided to the rear end side inner casing 12 of the rear end side module 3 are connected to the control circuit 510AES on the circuit board 50 via the circuit board 100 and the flexible cable 8.

The switch 15B in the present example is in an off state in the initial state in which the pen tip portion 5a of the electronic pen main body unit 5 is housed and protected within the pen tip side casing 2K. In addition, the switch 15B is configured to be on in the usable state in which the rear end side module 3 is rotated by, for example, 180 degrees about the axial direction with respect to the pen tip side module 2 and the pen tip portion 5a of the electronic pen main body unit 5 thereby protrudes from the opening 2Kb of the pen tip side casing 2K. This configuration can be realized by changing the positional relation in the circumferential direction (rotational direction of the rear end side module 3) between the pressing cam piece 7e of the coupling member 7 and the switch 15B from that of the electronic pen 1 according to the foregoing embodiment such that the switch 15B is on in the usable state in which the rear end side module 3 is rotated by 180 degrees.

Incidentally, also in the example of FIG. 10, it is possible to adopt a configuration in which the switch 15 is provided in addition to the switch 15B in order to perform the mode switching by rotating the rear end side module 3 by 180 degrees+60 degrees with respect to the pen tip side module 2. Alternatively, a configuration in which only the switch 15B is provided while the switch 15 is omitted may be adopted. In this case, it suffices for the rear end side module 3 to be configured to be capable of rotation by only 180 degrees with respect to the pen tip side module 2.

The control circuit 510AES monitors the on/off state of the switch 15B. The control circuit 510AES performs control to prevent the power supply voltage Vcc from being generated from the power supply circuit 504 by a control signal CT supplied to the power supply circuit 504, at a time of the initial state of the electronic pen in which the switch 15B is off. Moreover, at a time of the usable state of the electronic pen in which the switch 15B is on, the control circuit 510AES performs control to cause the power supply voltage Vcc to be generated from the power supply circuit 504 by the control signal CT supplied to the power supply circuit 504. Incidentally, even when the power supply voltage Vcc is not generated, a voltage that enables the monitoring of the on/off state of the switch 15B and the above-described operations (which voltage is lower than the power supply voltage Vcc) is supplied from the power supply circuit 504 to the control circuit 510AES.

Moreover, also in the present example, the wireless communication unit 102 disposed on the circuit board 100 provided to the rear end side inner casing 12 is supplied with the power supply voltage Vcc through the flexible cable 8 from the power supply circuit 504 on the circuit board 50 provided to the electronic pen main body unit 5, and the control circuit 510AES and the wireless communication unit 102 are connected to each other through the flexible cable 8.

Moreover, in the present example, the control circuit 510AES performs control to transmit the information regarding the detected pen pressure value, the identification information of the electronic pen main body unit 5 stored in the ID memory 506, and information regarding the on/off states of the side switches 56A and 56B to the external device such as the position detecting device through the wireless communication unit 102.

Incidentally, instead of wirelessly transmitting all of the information regarding the pen pressure value, the identification information of the electronic pen main body unit 5 stored in the ID memory 506, and the information regarding the on/off states of the side switches 56A and 56B by use of the wireless communication unit 102, one or two or more (which may be all) of these pieces of information may be configured to be transmitted to the position detecting sensor through the core body 511 together with a signal for position detection by changing the frequency of the signal from the signal transmitting circuit 512 or subjecting the signal to modulation (for example, ASK modulation, OOK modulation, or the like).

Further, in the present example, the control circuit 510AES receives a wireless signal from the external device such as the position detecting device through the wireless communication unit 102, and thereby performs, for example, timing control of the interaction of a signal for position detection or the like through the core body 511 with the position detecting sensor provided to the external device such as the position detecting device.

As described above, the electronic circuit of the electronic pen in the present example is configured to perform control to generate the power supply voltage Vcc from the power supply circuit 504 only in the usable state by turning on/off the switch 15B. Thus, the rechargeable battery 58 is consumed only in the usable state, so that power saving can be achieved in the electronic pen.

Incidentally, it is needless to say that the example of FIG. 10 is not limited to the case of the electronic pen of the active capacitive system and is similarly applicable also to the case of the electronic pen of the electromagnetic induction system described above.

OTHER EMBODIMENTS OR MODIFICATIONS

Incidentally, while examples such as the mode switching and the activation and non-activation of the operation of the electronic pen have been cited as applications (control instruction mode) associated with the turning on and off of the switch provided to the rear end side inner casing 12, the applications are not limited to these. For example, whether additional information such as the information regarding the pen pressure value, the identification information of the electronic pen main body unit 5 stored in the ID memory 506, and the information regarding the on/off states of the side switches 56A and 56B is received through the wireless communication unit 102 or received through signal interaction between the electronic pen and the position detecting sensor is generally determined in advance for each position detecting device.

Accordingly, when whether to transmit the additional information through the wireless communication unit or transmit the additional information through signal interaction between the electronic pen and the position detecting sensor is configured to be changed by turning on or off the switch 15 according to the configuration of the position detecting device, the electronic pen can be used in cooperation with position detecting devices having different directions of receiving the additional information. That is, the turning on/off of the switch 15 can be used to change a method of transmitting the additional information.

Incidentally, while only one switch 15 is provided at a predetermined angular position of the peripheral side surface of the rear end side inner casing 12 of the rear end side module 3 in the foregoing embodiment, a configuration in which a plurality of switches 15 are provided at different angular positions can be adopted.

For example, in the foregoing embodiment, the switch 15 is provided only at an angular position at which the switch 15 is turned on by the pressing cam piece 7e of the coupling member 7 when the rear end side module 3 is rotated by 240 degrees. However, a switch 15' having a configuration similar to that of the switch 15 may be further provided at an angular position at which the switch 15' is turned on by the pressing cam piece 7e of the coupling member 7 when the rear end side module 3 is further rotated by 60 degrees (total of 300 degrees), and the turning on and off of the switch 15' may be assigned to a control instruction mode different from the control instruction mode (the mode switching, a control instruction for the operation or non-operation of the electronic pen, or the like) assigned to the turning on and off of the switch 15.

Incidentally, the number of switches provided to the peripheral side surface of the rear end side inner casing 12 of the rear end side module 3 is not limited to two and, needless to say, may be three or more, and respective different control instruction modes can be assigned to the turning on and off of these plurality of switches.

In addition, in the foregoing embodiment, the electronic pen 1 is configured such that the electronic pen main body unit 5 is provided within the pen tip side casing 2K of the pen tip side module 2, and the electronic pen 1 is configured such that the pen tip portion 5a of the electronic pen main body unit 5 is protruded and retracted from the opening 2Kb of the pen tip side casing 2K. However, the present disclosure does not necessarily require the configuration in which the pen tip portion 5a of the electronic pen main body unit 5 is protruded and retracted from the opening 2Kb of the pen tip side casing 2K, and the present disclosure is applicable to all of configurations in which the rear end side module 3 is coupled to the pen tip side module 2 with the axial direction as a center and an instruction of the user (a mode switching instruction, a control instruction for the operation or non-operation of the electronic pen, or the like) is given by the rotation of the rear end side module 3.

For example, as in the electronic pen 1 according to the foregoing embodiment, the pen tip side module 2 and the rear end side module 3 are rotatably coupled to each other by providing the coupling member 7 on the pen tip side casing 2K side and providing the tubular member 11 configured to be fitted into the recessed portion 7a of the coupling member 7 on the rear end side module 3 side. In this case, the rotating cam portion 14 is not formed at the rear end side inner casing 12 of the rear end side module 3, nor is the sliding member 4 provided. A click operation of rotation is performed by the following configuration not using the rotating cam portion 14.

Figure 11:
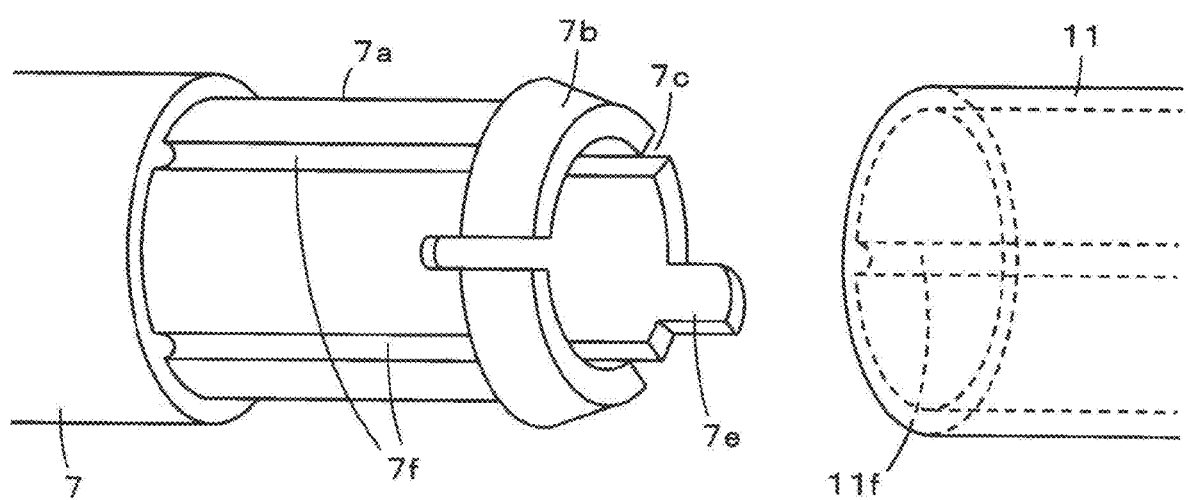
FIG. 11 is a diagram of assistance in explaining an example of a configuration of a coupling portion between a first casing and a second casing in the electronic pen according to a fourth embodiment of the present disclosure.

Specifically, as illustrated in FIG. 11, the recessed portion 7a of the coupling member 7 is provided with longitudinal grooves 7f in the axial direction at given rotational angle intervals, and the tubular member 11 is provided with ridges 11f to be fitted into the longitudinal grooves 7f. Thus, the rotation is realized such that a state of locking in a clicking manner is produced at a position at which the longitudinal grooves 7f and the ridges 11f are fitted to each other when the rear end side module 3 is rotated. Moreover, a plurality of switches (not illustrated in FIG. 11) having a configuration similar to that of the switch 15 are provided to the peripheral side surface of the rear end side inner casing 12 in such a manner as to correspond to respective angular positions at which the switches are locked in a clicking manner. Moreover, a pressing cam piece 7e that turns on and off these switches is formed on the coupling member 7 in advance as in the foregoing embodiment.

With the configuration as in the example of FIG. 11, when the rear end side module 3 is rotated, a different switch is turned on at each locking position at which the ridges 11f of the tubular member 11 are fitted to the longitudinal grooves 7f of the coupling member 7. Hence, an electronic pen that executes different control instruction modes at respective rotational angles by which the rear end side module 3 is rotated can be constructed by assigning the different control instruction modes to the respective switches in advance, as described above.

Incidentally, the peripheral surface of the recessed portion 7a of the coupling member 7 may be provided with ridges instead of being provided with the longitudinal grooves 7f, and the inner wall surface of the tubular member 11 may be provided with longitudinal grooves instead of being provided with the ridges 11f. In addition, a combination of recessed holes and protruding portions may be adopted instead of the combination of the longitudinal grooves and the ridges.

In the embodiment described above, a switch that mechanically drives a contact piece of the switch with the rotation of the rear end side module 3 is used as a section for detecting an instruction of the user by the rotation of the rear end side module 3 with respect to the pen tip side module 2. However, the section is not limited to such a mechanical switch.

For example, there may be adopted a configuration in which a magnetic field (magnetic flux) generating section such as a permanent magnet or an electromagnet is provided to the pen tip side module 2 side and a magnetic field detecting section (magnetic flux detecting section) for detecting a magnetic field (magnetic flux) of the permanent magnet, the electromagnet, or the like is provided to the rear end side module 3 side. An instruction of the user by the rotation of the rear end side module 3 may be detected from a detection output of the magnetic field detecting section (magnetic flux detecting section). In addition, there may be adopted a configuration in which the detection is performed optically by providing a light emitting source to the pen tip side module and providing a light receiving sensor to the rear end side module 3.

Incidentally, it is needless to say that a section for coupling between the pen tip side module 2 and the rear end side module 3 is not limited to the configuration using the coupling member 7 and the tubular member 11 and that various configurations are possible as the section for coupling between the pen tip side module 2 and the rear end side module 3.

In addition, the configuration housed in the pen tip side module 2 is not limited to the configuration of the modularized electronic pen main body unit 5, and may not be integrally modularized as long as the configuration has a circuit board and has a function of performing signal interaction with the position detecting sensor.

It is to be noted that the embodiment of the present disclosure is not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
    a first casing that is tubular and has an opening on a pen tip side of the first casing; and
    a second casing that is tubular and configured to be rotatably coupled to the first casing with an axial direction of the first casing as a center to receive an instruction of a user, on a side of the first casing opposite to the pen tip side of the first casing in the axial direction;
    the first casing including a first circuit board provided with a first circuit including a circuit that, in operation, performs signal interaction with a position detecting sensor,
    the second casing including a second circuit board provided with a second circuit connected to the first circuit, and
    the first circuit board and the second circuit board being electrically connected to each other by a flexible cable disposed in a state of having a surplus portion that is extendable or contractable in the axial direction of the first casing and is twistable in a rotational direction about the axial direction of the first casing.

2. The electronic pen according to claim 1, wherein an operation mode of the electronic pen is changed by rotating the second casing about the axial direction of the first casing with respect to the first casing.

3. The electronic pen according to claim 2, wherein the electronic pen is changed to a plurality of different operation modes according to a difference in magnitude of a rotational angle of the second casing about the axial direction with respect to the first casing.

4. The electronic pen according to claim 2, wherein the second casing is provided with a switch that, in operation, is turned on or off to change the operation mode of the electronic pen when the second casing is rotated about the axial direction of the first casing with respect to the first casing.

5. The electronic pen according to claim 1, wherein operation of the electronic pen is started by rotating the second casing in a first direction about the axial direction of the first casing with respect to the first casing, and operation of the electronic pen is stopped by rotating the second casing in a second direction opposite to the first direction.

6. The electronic pen according to claim 5, wherein the second casing is provided with a switch that, in operation, is turned on or off to control starting of the operation of the electronic pen or stopping of the operation of the electronic pen when the second casing is rotated about the axial direction of the first casing with respect to the first casing.

7. The electronic pen according to claim 1, wherein the second circuit board of the second casing is provided with a wireless communication circuit.

8. The electronic pen according to claim 1, wherein the second casing is provided with an external connection terminal electrically connected to the second circuit board.

9. The electronic pen according to claim 1, wherein the first casing includes a rechargeable battery, and the second casing is provided with a charging terminal electrically connected to the second circuit board.

10. The electronic pen according to claim 1, wherein: an electronic pen main body unit including the first circuit board is housed within the first casing, and the electronic pen includes a protruding and retracting mechanism that, in operation, slidingly moves the electronic pen main body unit in the axial direction of the first casing and protrudes, from the opening of the first casing, a front end portion of a pen tip side of the electronic pen main body unit in a state of the electronic pen main body unit not protruding from the opening in the first casing, when the second casing is rotated in a first direction about the axial direction of the first casing with respect to the first casing, and returns the front end portion of the pen tip side of the electronic pen main body unit to the state of the electronic pen main body unit not protruding from the opening in the first casing, when the second casing is rotated in a second direction opposite to the first direction.

11. The electronic pen according to claim 10, wherein: the protruding and retracting mechanism, in operation, sets the front end portion of the pen tip side of the electronic pen main body unit in a usage state in which the front end portion of the pen tip side of the electronic pen main body unit protrudes from the opening of the first casing, when the second casing is rotated in the first direction about the axial direction of the first casing by a first rotational angle with respect to the first casing, and the protruding and retracting mechanism maintains the usage state when the second casing is further rotated in the first direction by a second rotational angle, and, when the second casing is rotated by the second rotational angle, an operation mode of the electronic pen main body unit is changed to an operation mode different from an operation mode in the usage state in which the second casing is rotated by the first rotational angle.

12. The electronic pen according to claim 10, wherein: the electronic pen main body unit houses the first circuit board within a main body unit casing that is tubular, the first circuit board is provided with a side switch, and the main body unit casing has a first through hole at a position above the side switch, the first casing is provided with a second through hole that externally operably exposes a switch operating portion of the side switch, and, in a usage state in which the front end portion of the pen tip side of the electronic pen main body unit is protruded from the opening of the first casing, the first through hole and the second through hole are set in a positional relation in which the first through hole and the second through hole are aligned with each other in a direction orthogonal to the axial direction of the first casing, and in the usage state, an operation of depressing the side switch by the switch operating portion is enabled.

13. The electronic pen according to claim 1, wherein the signal interaction with the position detecting sensor is performed by an electromagnetic induction system.

14. The electronic pen according to claim 1, wherein the signal interaction with the position detecting sensor is performed by an active capacitive system.

15. The electronic pen according to claim 2, wherein: the signal interaction with the position detecting sensor is performed by an electromagnetic induction system, and the operation mode is changed by changing a resonance frequency of a resonance circuit that, in operation, performs the signal interaction with the position detecting sensor.

16. The electronic pen according to claim 2, wherein: the signal interaction with the position detecting sensor is performed by an active capacitive system, and the operation mode is changed by changing a mode of transmission of a signal transmitted from the electronic pen configured to perform the signal interaction with the position detecting sensor.

17. The electronic pen according to claim 1, wherein the surplus portion of the flexible cable overlaps a flat surface of the flexible cable in a direction orthogonal to the flat surface of the flexible cable by folding back the flexible cable extending in the axial direction of the first casing, in a direction opposite to an extending direction of the flexible cable.

18. The electronic pen according to claim 10, wherein: the protruding and retracting mechanism includes a rotating cam portion formed at a front end portion in an axial direction of an internal casing provided within the second casing and a sliding member configured to engage with the rotating cam portion and slidingly move in the axial direction of an internal casing, and the electronic pen main body unit is slidingly moved in the axial direction by a sliding movement of the sliding member.

* * * * *